US012384932B2

(12) United States Patent
Pal et al.

(10) Patent No.: US 12,384,932 B2
(45) Date of Patent: Aug. 12, 2025

(54) PACKAGING COATINGS, PACKAGING PRODUCTS, AND METHODS OF MAKING

(71) Applicant: North Carolina State University, Raleigh, NC (US)

(72) Inventors: Lokendra Pal, Raleigh, NC (US); Martin Hubbe, Raleigh, NC (US); Lucian Lucia, Raleigh, NC (US); Preeti Tyagi, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 17/451,586

(22) Filed: Oct. 20, 2021

(65) Prior Publication Data

US 2022/0127486 A1    Apr. 28, 2022

Related U.S. Application Data

(60) Provisional application No. 63/105,114, filed on Oct. 23, 2020.

(51) Int. Cl.
*C09D 101/02* (2006.01)
*B29C 39/00* (2006.01)
(Continued)

(52) U.S. Cl.
CPC .......... *C09D 101/02* (2013.01); *B29C 39/003* (2013.01); *B32B 9/02* (2013.01);
(Continued)

(58) Field of Classification Search
CPC .................. D21H 11/18; C09D 101/00–06
See application file for complete search history.

(56) References Cited

U.S. PATENT DOCUMENTS

2008/0146701 A1* 6/2008 Sain .................. D21C 5/00
428/220
2014/0154757 A1* 6/2014 Nelson ............... D21H 11/18
536/56
(Continued)

FOREIGN PATENT DOCUMENTS

CN          1417409 A  *  5/2003  ............. D21H 11/12
CN       111138719 A  *  5/2020  ............... C08J 3/12
(Continued)

OTHER PUBLICATIONS

Machine translation of WO 2012/156652 A1, obtained from EspaceNet.*
(Continued)

*Primary Examiner* — Z. Jim Yang
(74) *Attorney, Agent, or Firm* — THOMAS | HORSTEMEYER, LLP

(57) ABSTRACT

Provided are barrier films, packaging products including barrier films, and methods of making paper/packaging products including barrier films. The barrier films can have antimicrobial properties and can include nanofibrillated cellulose treated with hemp extractives. The nanofibrillated cellulose can be obtained from autohydrolysed hemp pulp. The antimicrobial packaging products or paper products can be made by obtaining pulp fibers from autohydrolyzed hemp hurds, mechanically grinding the pulp fibers to obtain nanofibrillated cellulose, solvent casting the nanofibrillated cellulose films in an aqueous system, treating the nanofibrillated cellulose films with hemp extractives, and applying the hemp extractive treated films to a substrate.

21 Claims, 20 Drawing Sheets

(51) Int. Cl.
*B32B 9/02* (2006.01)
*B32B 9/06* (2006.01)
*B65D 65/42* (2006.01)
*B29K 1/00* (2006.01)

(52) U.S. Cl.
CPC ............... *B32B 9/06* (2013.01); *B65D 65/42* (2013.01); *B29K 2001/00* (2013.01); *B32B 2307/718* (2013.01); *B32B 2307/732* (2013.01); *B32B 2439/70* (2013.01); *B32B 2553/00* (2013.01)

(56) References Cited

U.S. PATENT DOCUMENTS

| | | | | |
|---|---|---|---|---|
| 2015/0368368 | A1* | 12/2015 | Retsina | C08J 7/12 127/29 |
| 2016/0319482 | A1* | 11/2016 | Ben | D21H 11/08 |
| 2016/0369121 | A1* | 12/2016 | Lapidot | B01J 20/24 |
| 2019/0248987 | A1* | 8/2019 | Moolman | C04B 28/10 |
| 2019/0264385 | A1* | 8/2019 | Pauwels | D21B 1/026 |
| 2019/0292337 | A1* | 9/2019 | Heiskanen | C08J 5/18 |
| 2020/0340145 | A1* | 10/2020 | Sunderland | C08J 3/226 |
| 2021/0030824 | A1* | 2/2021 | Jansen | A61K 36/185 |
| 2022/0195248 | A1* | 6/2022 | Lagaron Cabello | B29C 51/02 |
| 2022/0410032 | A1* | 12/2022 | Diaz Merchan | B01D 11/0296 |
| 2023/0183499 | A1* | 6/2023 | Monnard | C09D 5/00 428/34.8 |
| 2023/0354807 | A1* | 11/2023 | Afewerki | A01N 37/36 |

FOREIGN PATENT DOCUMENTS

| | | | | |
|---|---|---|---|---|
| EP | 1896508 B1 | * | 10/2017 | ............... C08B 1/00 |
| JP | 2003119654 A | * | 4/2003 | ........... D21H 25/005 |
| JP | 2019156789 A | * | 9/2019 | |
| WO | WO-2012156652 A1 | * | 11/2012 | ............. C08B 15/10 |

OTHER PUBLICATIONS

The Content and Antioxidant Activity of Phenolic Compounds in Cold-Pressed Plant Oils, Siger et al; Journal of Food Lipids 15 (2008) 137-149.*
Machine translation of JP 2019/156789 A.*
Machine translation of CN 111138719 A.*
Machine translation of CN 1417409 A.*
Machine translation of JP 2003/119654 A.*

* cited by examiner

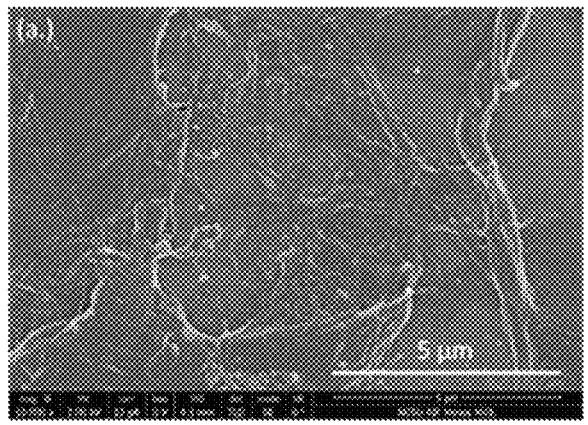 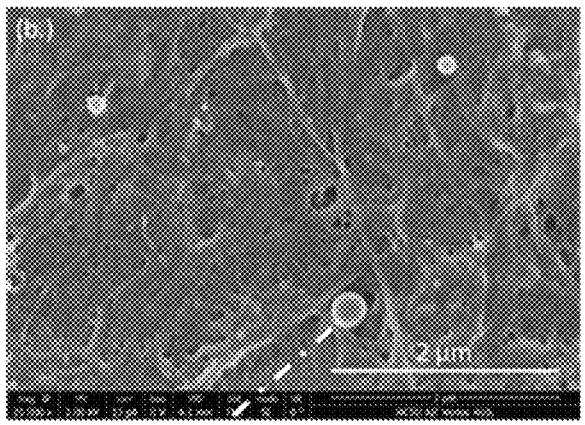
Fig. 13A    Fig. 13B
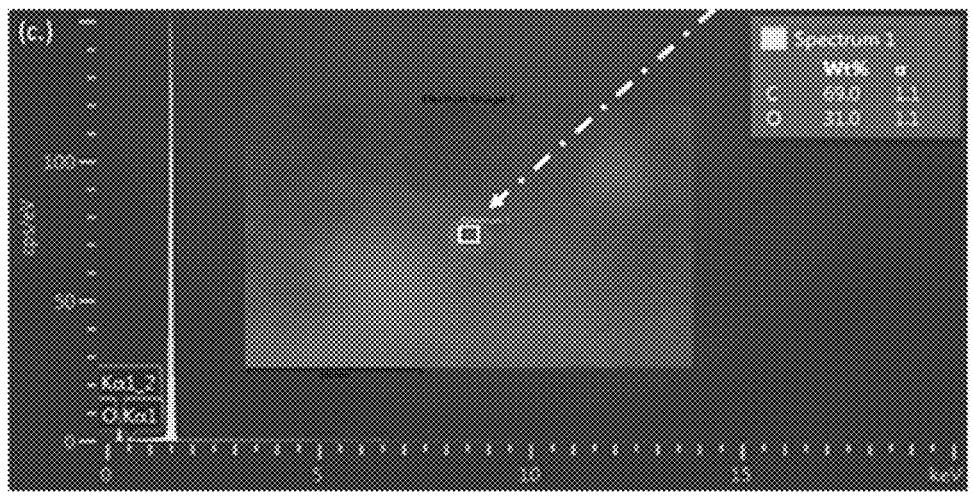
Fig. 13C

PACKAGING COATINGS, PACKAGING PRODUCTS, AND METHODS OF MAKING

CROSS-REFERENCE TO RELATED APPLICATIONS

This application claims the benefit of and priority to U.S. Provisional Application Ser. No. 63/105,114, having the title "PACKAGING COATINGS, PACKAGING PRODUCTS, AND METHODS OF MAKING", filed on Oct. 23, 2021, the disclosure of which is incorporated herein by reference in its entirety.

BACKGROUND

Industrial hemp is a renewable and sustainable resource for a wide variety of consumer and industrial products. However, hemp hurd is typically a waste byproduct. Hemp extractives have been shown to have some antimicrobial activity.

SUMMARY

Embodiments of the present disclosure provide barrier films, coatings, packaging products including barrier films or coatings, paper products including barrier films or coatings, methods of making antimicrobial paper products, and the like.

An embodiment of the present disclosure includes barrier films or coatings that include nanofibrillated cellulose, wherein the nanofibrillated cellulose can be treated with hemp extractives.

An embodiment of the present disclosure also includes packaging products that can include a substrate having a barrier film or coating. The barrier film or coating can include nanofibrillated cellulose obtained from autohydrolysed hemp pulp. The nanofibrillated cellulose can be treated with hemp extractives.

An embodiment of the present disclosure also includes methods of making an antimicrobial paper product. The method can include obtaining pulp fibers from autohydrolyzed hemp hurds and mechanically grinding the pulp fibers to obtain nanofibrillated cellulose. Solvent casting the nanofibrillated cellulose films can in occur in an aqueous system. The method can further include treating the nanofibrillated cellulose films with hemp extractives and applying the hemp extractive treated films to a substrate.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIGS. 13A-13C provide SEM images of Hemp-A LNFC at two different magnifications: (FIG. 13A) 10,000×, (FIG. 13B) 25,000× (FIG. 13C) EDX spectra of spherical particle in accordance with embodiments of the present disclosure.

Figure 1:
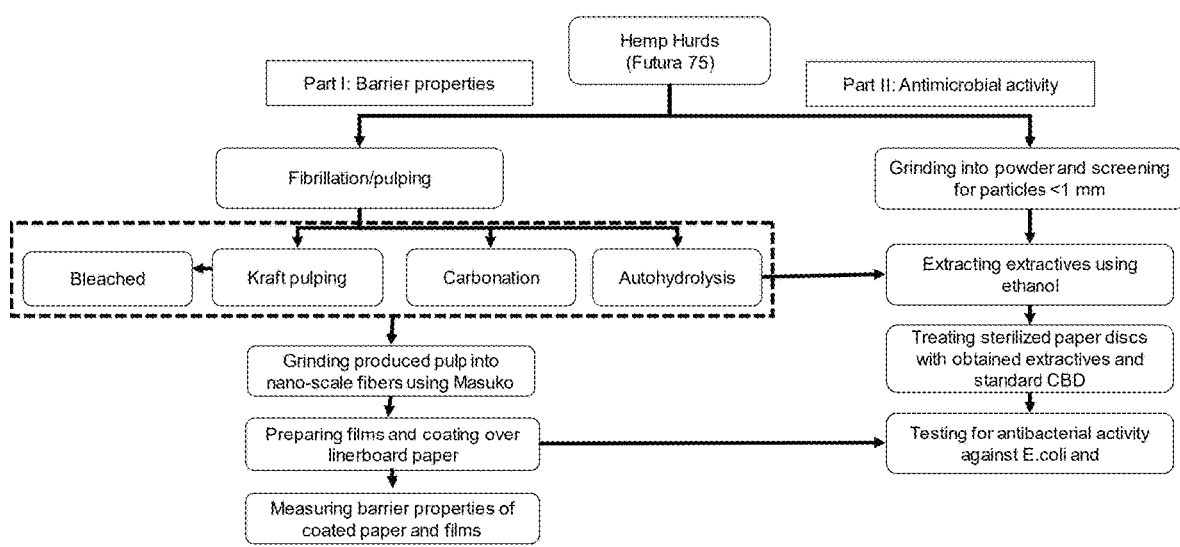
FIG. 1 provides a schematic for testing barrier and antimicrobial properties of hemp hurd extractives and nanocellulose.
Figure 2A:
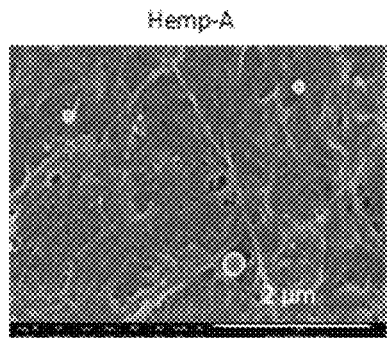
FIGS. 2A-2G provide 25,000×SEM images of lignin-containing cellulose nanofibers obtained from differently processed hemp and hardwood pulp in accordance with embodiments of the present disclosure.
Figure 2B:
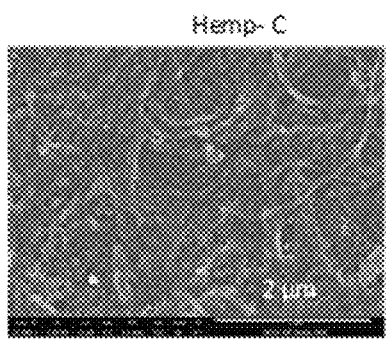
Figure 2C:
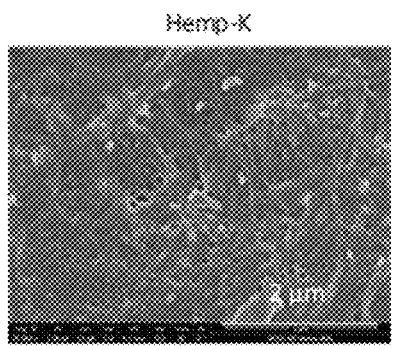
Figure 2D:
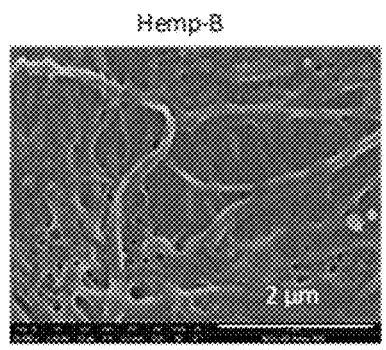
Figure 2E:
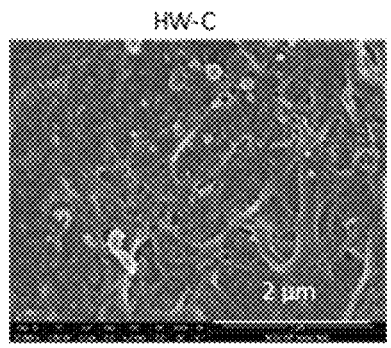
Figure 2F:
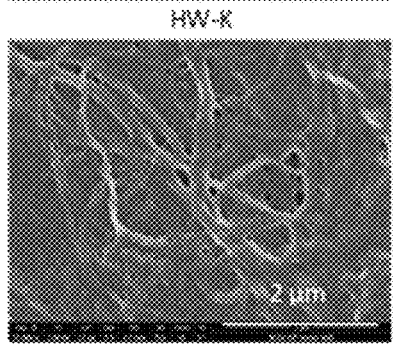
Figure 2G:
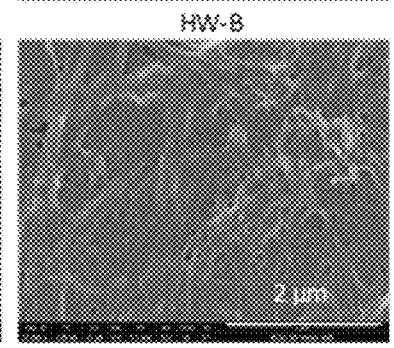

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art.

The following examples are put forth so as to provide those of ordinary skill in the art with a complete disclosure and description of how to perform the methods and use the materials disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

Abbreviations

NFC, nanofibrillated cellulose; CNF, cellulose nanofibers; LCNF, lignin-containing cellulose nanofibers; lignin-containing nanofibers (NFC, CNF, LCNF can be used interchangeably), HW, hardwood; Hemp-C, carbonate-treated hemp; Hemp-A, autohydrolyzed hemp; BK, bleached kraft; UK, unbleached kraft; Hemp-P, hemp powder.

General Discussion

In accordance with the purpose(s) of the present disclosure, as embodied and broadly described herein, embodiments of the present disclosure, in some aspects, relate to films and packaging products including hemp extractives.

In general, embodiments of the present disclosure provide for methods of making barrier films or coatings, compositions including hemp extractives, and products including barrier films or coatings.

The present disclosure includes a barrier film or coating including nanofibrillated cellulose (NFC) obtained from autohydrolyzed hemp pulp, wherein the NFC is treated with hemp extractives. Advantageously, the barrier film or coating has antimicrobial and hydrophobic properties. The antimicrobial properties include about a 98% or greater reduction in colony forming units when compared to an untreated substrate. The barrier film or coating can have a water contact angle of about 80°-102°. Such antimicrobial and hydrophobic properties can be beneficial for certain types of product packaging.

In some embodiments, the barrier film can be used as a standalone packaging product. In some embodiments, the barrier film can be applied to a substrate to form a packaging product.

In some embodiments, the hemp extractives can be extracted from hemp powder using appropriate solvents, including but not limited to ethanol and benzene. In other embodiments, the hemp extractives can be extracted from hemp, hemp hurds, hemp bast fibers, hemp mixed fibers and the extraction can be performed with ethanol and benzene or other volatile solvents. In some other embodiments, the hemp extractives can be extracted from hemp, hemp hurds, hemp-based fibers, hemp mixed fibers and the extraction can be performed using polar and non-polar solvents such as petroleum ether, acetone, methanol, ethanol. In yet other embodiments, the hemp extractives can be obtained using supercritical carbon dioxide. In yet other embodiments, the hemp extractives can be obtained from commercial sources.

In some embodiments, the barrier film or coating can have a basis weight of greater than 15 g/m$^2$, a basis weight of about 25 g/m$^2$, or a basis weight of about 50 g/m$^2$.

In some embodiments, the barrier film or coating can have a thickness of about of 15 μm to 250 μm.

Embodiments of the present disclosure include packaging products including a barrier film or coating as above applied to a substrate. The substrate can include containerboard packaging paper, linerboard packaging paper, whitetop, mottled white, brown paper, kraft liners, recycled paper, cartoonboards, folding boxboard, kraft papers, solid unbleached board, solid bleached board, or food packaging papers. In some embodiments, the substrate can include flexible substrates such as creped or uncreped tissue papers, single or multiply towel papers, single face corrugated papers or napkin paper for food sanitary applications.

In some embodiments, the barrier film or coating can be solvent casted, solvent casted and air-dried, solvent casted and hot air dried, vacuum casted, filtered casted, filtered and pressed formed, vacuum dewatered and air-dried, mold casted, or a combination thereof.

In some embodiments, the barrier film or coating can be applied using size press, metered size press, rod coater, blade coater, spray coating, dip coating, slot die coating, flexo coater, gravure coater, curtain coater or a combination thereof.

In some embodiments, the packaging product can have a basis weight of greater than 15 g/M$^2$.

In some embodiments, the packaging product can have a multiply construction bonded mechanically, chemically, thermally or a combination thereof.

In some embodiments, the coating or film can be applied in the inline during papermaking process, nearline using rod coater, blade coater, spray coating, dip coating, slot die coating, flexo coater, gravure coater, curtain coater or a combination thereof or offline in a converting process such as lamination, embossing, calendering, curing, printing, or combination thereof.

Embodiments of the present disclosure include methods of making barrier films or coatings and antimicrobial paper products. The method can include obtaining pulp fibers from hemp hurd, mechanically grinding the pulp fibers to obtain NFC, extracting hemp extractives using a solvent system, treating the NFC with hemp extractives in a film or coating form, and applying the hemp extractives treated films or coatings to a substrate, post-treating and converting the substrates to a packaging product.

In some embodiments, the method can further include lamination, embossing, calendaring, or printing the substrate. In some embodiments, the method can further include embossing, metallizing, calendaring, printing, gluing, diecutting the coated substrate.

EXAMPLES

Example 1

This study includes the effects of the selection of feedstock and processing conditions on chemical and morphological properties of the produced nanofibrillated cellulose or nanofibers or lignin-containing nanofibrillated cellulose or lignin-containing nanofibers and their barrier and antimicrobial properties. A non-wood feedstock from hemp hurd fibers is selected for producing lignin-containing cellulose nanofibers. The hemp hurds are obtained from industrial hemp stalks and defibrillated/pulped using four different pulping processes, namely autohydrolysis (with water), alkaline/carbonate (4% Na2CO3), unbleached kraft (Na2S+ NaOH), and bleached kraft. Lignin-containing and bleached hemp cellulose nanofibers (CNF) were produced using a high-speed mechanical grinding process. For comparison of hemp CNF, hardwood (Eucalyptus) was used and processed in a similar fashion to obtain hardwood (HW) CNF. The morphological properties characterized using SEM showed that lignin containing CNF were more fibrillated compared to bleached CNF from both hemp and HW fibers. The obtained CNF were used to prepare films and serve as coatings over linerboard paper for barrier and antimicrobial property measurements. The chemical characterization of CNF films carried out using ToF-SIMS showed a progressive reduction in surface lignin for carbonate (C), unbleached kraft (UK) and bleached kraft (BK) CNF. When HW fibers were compared, hemp fibers were observed to be more fibrillated, which was evident from CNF diameters. Hemp authydrolyzed (A) pulp containing highest lignin content (23.9%) was observed with relatively lower surface lignin compared to hemp-C, and hemp-UK CNF. The Crystallinity Index (CI) of hardwood CNF was observed, increasing in a progressive manner for HW-C<HW-UK<HW-BK. However, no big difference in CI of hemp-C, hemp-UK, and hemp-BK was observed. The highest water contact angle (WCA) was measured for hemp-K CNF films (104°) followed by hemp-C (102°), HW-K (86°, and HW-C (84°). A similar trend of contact angle was observed with coated paper, though with lower contact angle ranging between 74°-81°. The water absorption was also found to be lower for lignin containing CNF coated paper compared to bleached CNF. However, when relative water absorption for hemp and HW CNF films was measured, BK CNF was found to accept less water compared to C and UK treated paper due to very high density of BK CNF films. The water permeability (WVP) was also found to be more related to the density rather than the lignin content of CNF coatings and films. The lowest WVP was observed with hemp-BK and HW-K CNF films as 5.85 mm·g/m2/day and 6.12 mm·g/m2/day, respectively.

For testing antimicrobial activity of hemp hurds and processed fibers, the extractives were extracted. The characterization of hemp hurds for the presence of antimicrobial active compounds was carried out using GC-MS. In GC-MS chromatographs of hemp hurd powder (hemp-P), CBD was observed, compared to and confirmed by commercially obtained standard CBD chromatographs. The CNF films and coated papers were tested against *E. coli* for their antimicrobial activity. However, no significant antimicrobial activity was observed. Then, the sterilized paper discs and hemp-A films were treated with the extractives obtained from hemp-P, hemp-A, hemp-C, hemp-K and hemp-B. Hemp-P and hemp-A extractive treated paper showed a significant reduction bacterial growth that resulted in a zone of bacterial inhibition of 1.85 and 1.05 cm respectively in disk diffusion assay. The results were confirmed by doing a colony forming assay, and a 98% and 55% reduction in colony forming units was observed for hemp-P and hemp-A extractive treated paper. The results of using hemp CNF as barrier and antibacterial coatings create a great potential for valorizing industrial hemp waste for value added products.

Exploring lignin containing nanocellulose and extractives from hemp hurds provides another opportunity to develop barrier and antimicrobial films and coatings with one feedstock and the least required chemical modification.

Hemp hurd wood/shives were defibrillated to lignin containing CNF using autohydrolysis and other conventional pulping methods. Nanoscale hemp fibers would expose more cannabinoids and lignin on the coatings and film surface.

First, LCNF produced from hemp hurds includes exploring barrier properties of hemp LCNF, primarily focusing on water sensitivity. Eucalyptus LCNF was also investigated to compare the effect of raw material on barrier properties. The second part of the study included the testing of antimicrobial properties of hemp LCNF. Since only hemp hurd powder without extraction has been confirmed to have antimicrobial activity, the hemp hurds extractives were also extracted from hemp hurd powder and tested for their antimicrobial property. A detailed description of the experimental plan of work for exploring the barrier and antimicrobial properties of hemp hurd waste is summarized in FIG. 1.

Experimental

Materials

Dew retted and decorticated, Futura 75 hemp (*Cannabis sativa* L.) hurds stems were procured from the Netherlands and cut into small pieces before use. Sodium carbonate, sodium hydroxide, and sodium sulfite used for carbonate and kraft pulping were procured from Sigma-Aldrich at 98% purity. Chlorine dioxide and hydrogen peroxide used to bleach kraft pulp were obtained from Sigma Aldrich at 99% purity. A masuko grinder was used to prepare nanocellulose. Eucalyptus (hybrid of *E. grandis* and *E. urophylla*) chips were obtained from Brazil. A brown linerboard with a basis weight of 130 g/m2 and bulk of 1.5 cm3/g was used as a coating substrate. A wiley mill grinder was used to grind the hemp hurds into powder, and then they were screened through 40 mesh screens to get 1 mm snippets. Ethanol and benzene was used for the extraction process and was procured from Sigma-Aldrich at 99.98% purity. Abn-CBD ($C_{21}H_{30}O_2$) solubilized in methyl acetate (5 mg/ml) was procured from TOCRIS Biosciences at 99.7% purity.

Methods

The autohydrolysis (A) pulping was carried out by soaking cut pieces of hemp hurd stems in distilled water with a hemp to water ratio of 8:1 at a temperature 160° C. for 3 hours in a stainless-steel reactor at pressure 90 psi. After three hours, the softened hemp hurd stems (pulp) were washed and refined on the laboratory disc refiner at disc gaps of (0.1-0.05) mm with two passes before screening on a 0.15-mm slotted laboratory screen. For a mild alkaline/carbonate (C) pulping, 4 wt. % sodium carbonate ($Na_2CO_3$) was used under the same conditions: 160° C. for 3 hours with 8:1 ratio of hemp to 4% $Na_2CO_3$. Unbleached kraft (UK) pulp fibers of hemp were obtained using 12% active alkali-25% sulfidity (NaOH+Na2S) (as Na2O) with a 6:1 solid to liquor ratio under the same conditions. To obtain bleached kraft (BK) pulp fibers, the DO(EP)D1 sequence was used to obtain a final product of 85% ISO brightness. To compare the hemp hurd fibers with hard wood fibers, similar pulping and bleaching processes were used to obtain cellulose fibers from eucalyptus chips. However, a lower (4:1) solid to liquor ratio was used for defibration of eucalyptus chips due to its high bulk density compared to hemp hurds. Due to the high density and intact structure of eucalyptus chips, the autohydrolysis process could not result in fibers, and only alkaline, unbleached, and bleached kraft pulping processes were used for defibrillation. Extractives wt. % and lignin wt. % in samples were estimated using TAPPI T204 and T236 methods respectively. The ratio of soluble and insoluble lignin in all pulp samples was determined using the NREL Laboratory Analytical Procedure (LAP) (NREL/TP-510-42618) and TAPPI T222 method.

To achieve a similar diameter range of nano-scale fibers, fibrillation of differently processed cellulose fibers was carried out using a Masuko grinder at 1500 rpm using 16-30 passes. The details of energy consumption in production of each type of nanocellulose is given in Table 1.

TABLE 1

Conditions and energy consumption for producing LCNF

| Pulp type | Number of passes | Energy consumption (kWh/tons) | Final Consistency (%) |
|---|---|---|---|
| Hemp-A | 30 | 4213 | 2.48 |
| Hemp-C | 25 | 4584 | 2.39 |
| HW-C | 25 | 3885 | 2.18 |
| Hemp-UK | 15 | 6661 | 2.13 |
| HW-UK | 10 | 6010 | 1.63 |
| Hemp-BK | 16 | 4911 | 2.54 |
| HW-BK | 16 | 3197 | 1.96 |

The morphological characterization of produced LCNF was carried out using scanning electron microscopy (SEM) under FEI XHR-VERIOS 460L field emission SEM. ToF-SIMS spectra and images were obtained using a TOF SIMS V (ION TOF, Inc. Chestnut Ridge, NY) instrument to show the distribution of lignin on fibers. The X-ray diffraction spectra were obtained with a Rigaku SmartLab diffractometer to obtain crystallinity of LCNF films. The angle was varied to 0.05° per step starting at 2θ angles from 5° to 50°. The diffraction data obtained for each sample were deconvoluted to obtain the area for amorphous peaks and crystalline peaks. The chemical characterization of extractives from differently processed hemp hurds was carried out using gas chromatography and a mass spectrometer (GC-MS). Extractives were dissolved in methyl acetate before being analyzed with GC-MS.

Prepared nanocellulose samples at 1.5% consistency were coated over the selected linerboard packaging paper using a lab scale benchtop rod coater using Mayer rod number 16, as described in chapter 2 and 3 and dried with hot air. This coating process was repeated 3-4 times to obtain ~5 g/m2 of coat weight. The linerboard papers were calendared before and after coating at 100° C. temperature and 1000 psi pressure. The nanocellulose films with thickness 50 μm were prepared by using the solvent casting method in teflon petri dishes under controlled conditions. The coated linerboard paper and films were conditioned at 23° C. and 50% RH for 24 hours before testing.

To analyze the hydrophobicity of LCNF coated papers and films, water contact angle was measured using the sessile drops method with a SEO Phoenix 150/300 contact angle system) and a CCD camera at room temperature (23° C.). The water vapor transmission rate (WVTR) was measured at 23° C. and 50% RH using the ASTM E96 wet-cup method with coating side towards the high humidity. Water absorption (g/m2) of coated paper was determined using the Cobb60 TAPPI T441 method. Relative water absorption (RWA %) was determined by immersing 5 cm diameter films in deionized water and recording the sample weight after 2 hours. The excess water was removed by means of a standard roller using blotting paper on both sides of the film samples before weighing the samples. The RWA was determined using the following equation:

$$RWA\% = \frac{wt_{0h} - wt_{2h}}{wt_{0h}}$$

where $wt_0$ and $wt_{2h}$ are the weights of the sample before and after 2 hours of immersion in water, respectively. Air permeance of the coated substrate was determined using TAPPI T460 "Gurley Densometer method."

The antimicrobial activity of differently processed hemp nanocellulose coated linerboard papers was tested against *E. coli* using a Disk diffusion (Kirby-Bauer) assay. For the disk diffusion assay, the overnight grown culture of E. coli in lysogeny broth (LB) media was diluted to 0.5 McFarland concentration (0.5 OD at 600 nm) using a KH2PO4 buffer. The 100 µl culture was transferred to the LB agar plates. The extractives obtained from hemp hurd powder and processed pulps were used to treat a sterilized filter paper substrate. The 200 µl of each extractive samples (1 mg/ml) were added to different filter discs and dried before being placed over the E. coli culture spread on LB agar plate. The treated E. coli plates were incubated overnight at 37° C. The inhibited bacterial growth was measured using a ruler by subtracting the diameter of the original disk from the diameter of the zone of inhibition (a transparent area devoid of E. coli growth). The antimicrobial activity of hemp-hurd extractives was also confirmed using ASTM E2149 method. For comparison, the antimicrobial test of pure CBD oil procured from TOCRIS Biosciences as positive control was also carried out.

Results and Discussions
Part I: Barrier Properties

TABLE 2

Lignin and extractives composition of treated fibers

| Sample | Klason lignin [%] | Acid soluble lignin [%] | Total lignin [%] | Extractives [%] |
|---|---|---|---|---|
| Hemp-P | 23.78 | 1.069 | 24.849 | 5.9 |
| Hemp-A | 23.02 | 0.878 | 23.898 | 5.8 |
| Hemp-C | 22.03 | 1.077 | 23.107 | 2.6 |
| Hemp-UK | 14.01 | 1.034 | 15.044 | 2.6 |
| Hemp-BK | 0.06 | 0.778 | 0.838 | 1.2 |
| HW-C | 21.63 | 1.502 | 23.132 | 6.9 |
| HW-UK | 8.13 | 1.074 | 9.204 | 6.5 |
| HW-BK | 0.06 | 0.837 | 0.897 | 2.6 |

Lignin and Extractives Content

Table 2 provides the content (wt. %) of lignin and extractives in differently treated pulp fibers. The extractives and lignin amount present in untreated hemp hurd ground powder and auto-hydrolyzed hemp hurd pulp were found to be comparable. As desired, most of the lignin and extractives were retained with the fibers after pulping and washing steps. However, with carbonate pulping, a significant reduction in extractives was observed, while lignin content was found to be similar to that of auto-hydrolyzed pulp fibers. Compared with carbonate pulping, kraft pulping resulted in the reduction of lignin amount by 35% and 60% for hemp and HW pulp fibers respectively.

Surprisingly, the wt. % of extractives remained the same for carbonate and kraft pulping treatments in both hemp and HW fibers. For both hemp and HW pulp, bleaching of kraft pulp resulted in traces or almost no amounts of lignin; however, extractives were still found to be relatively higher. The key point that should be noticed here is the amount of acid soluble lignin (ASL) present in differently treated hemp and HW fibers. ASL is considered to be relatively hydrophilic compared to klason lignin (KL). It has been observed that ASL is typically composed of low-molecular weight products and hydrophilic lignin derivatives formed during lignin degradation while the pulping/defibration process occurs. Among unbleached fibers, hemp-A pulp was observed to have the least amount of ASL and highest amount of KL. Though bleached hemp and HW pulp had almost no KL, they were found to have significant amounts of ASL compared to others.

Morphological and Chemical Characterization of LCNF

The SEM images in FIGS. 2A-2G differentiate the morphology of nanocellulose fibers obtained from differently pre-treated hemp and HW (eucalyptus) fibers. When compared to the same pre-treated fibers, nano cellulose fibers obtained from hemp were found to be more fibrillated than hardwood fibers. LCNF appeared to have lower diameters compared to bleached CNF, which is consistent with earlier studies and was confirmed by measuring diameter of 100 fibers from SEM images using ImageJ software. The diameter of Hemp-A, Hemp-C, Hemp-K, Hemp-B, HW-C, HW-K and HW-B were found to be 45±10, 67±14, 98±11, 138±26, 72±14, 136±34, 104±18 nm respectively. This can be related to the antioxidation scavenging ability of the lignin to prevent the back crosslinking of cellulosic mechano-radicals produced during the mechanical fibrillation process. This results in more fibrillated and reduced diameter fibrils. In summary, the lignin containing fibers were found to be fibrillated more extensively compared to bleached fibers. Comparing hemp and HW, CNF from hemp were observed to be more fibrillated. This can be related to the higher hemicellulose and pectin content present in hemp compared to HW. Higher amount of hemicellulose should correspond to a higher negative charge on fibers that facilitate the easier fibrillation due to more swellability of fiber walls.

Lignin Distribution on the Surface of Nanocellulose Films

Figure 3A:
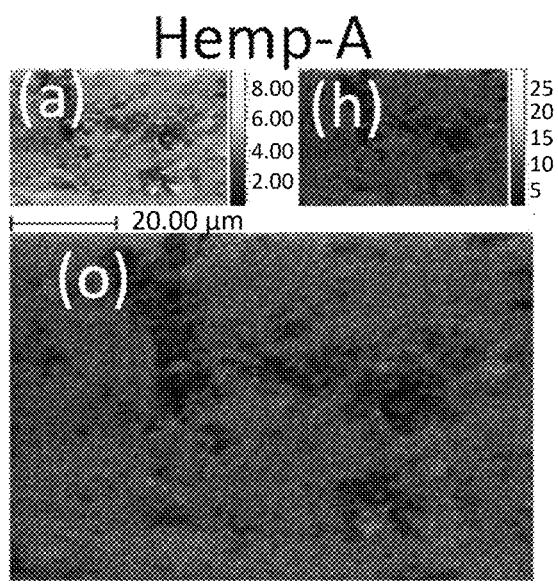
FIGS. 3A-3H show total positive fragments ToF-SIMS images of hemp and HW nanocellulose films (specimens a, b, c, d, e, f, g), G (C8H9O2+, C8H7O3+) and S(C9H11O3+, C9H9O9+) lignin fragments images (specimens h, i, j, k, l, m, n), RGB overlay of lignin images (as green) over total (as red) fragments images (specimens o, p, q, r, s, t, u), and spectrum of all films.
Figure 3B:
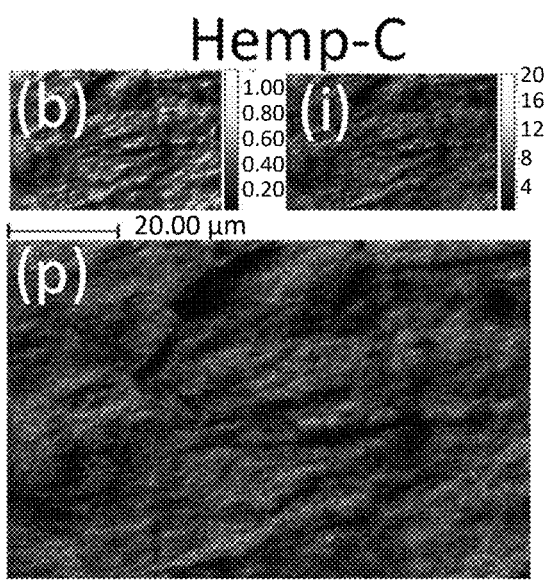
Figure 3C:
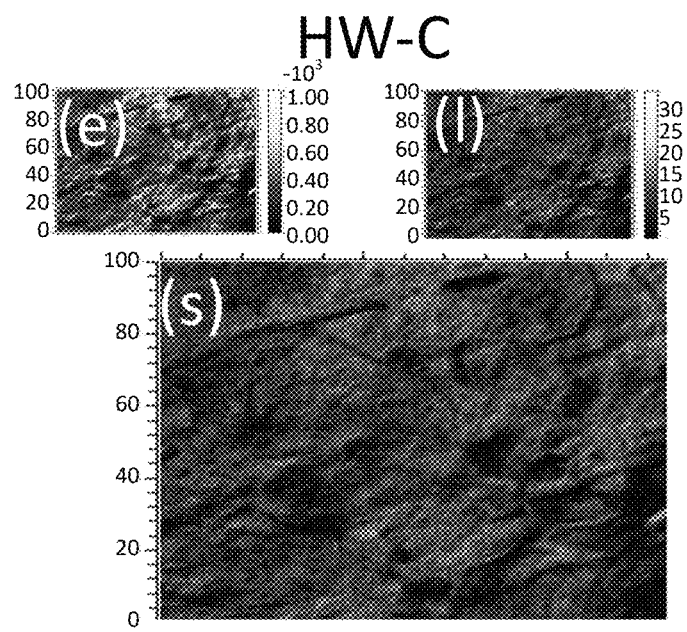
Figures 3D, 3E:
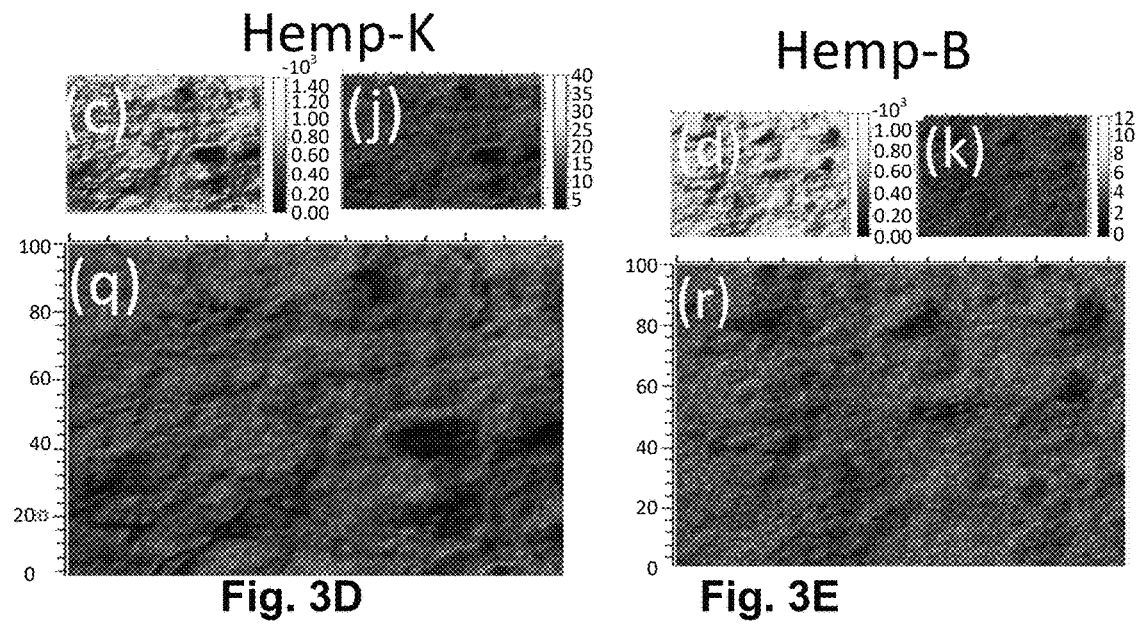
Figures 3F, 3G:
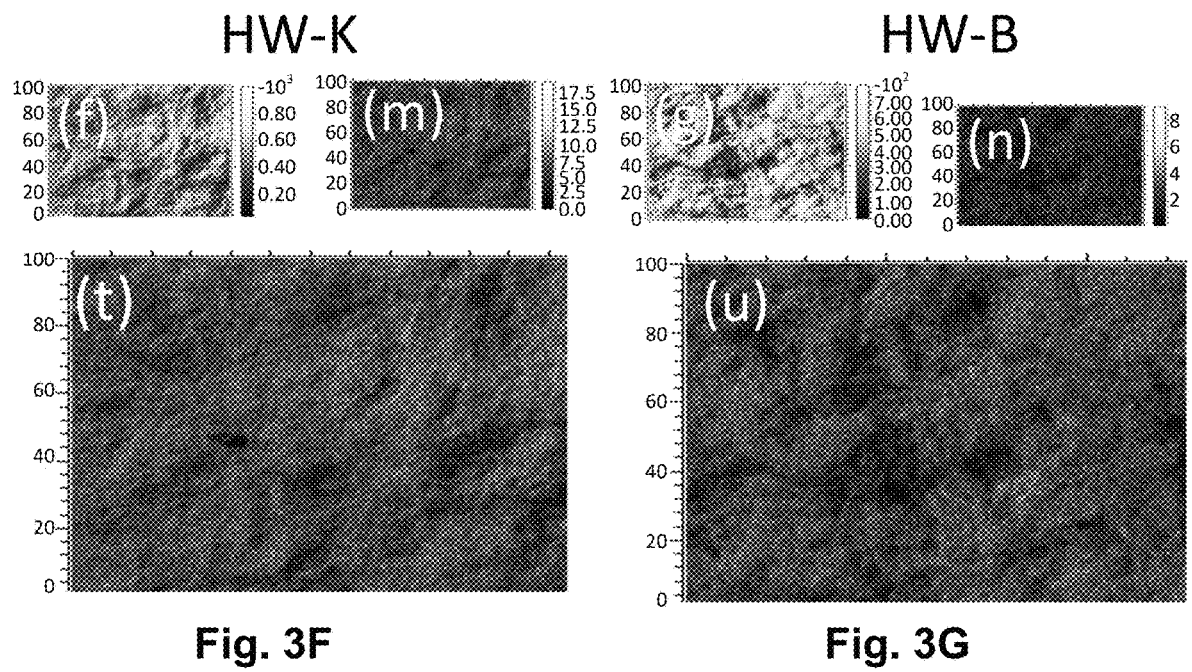
Figure 3H:
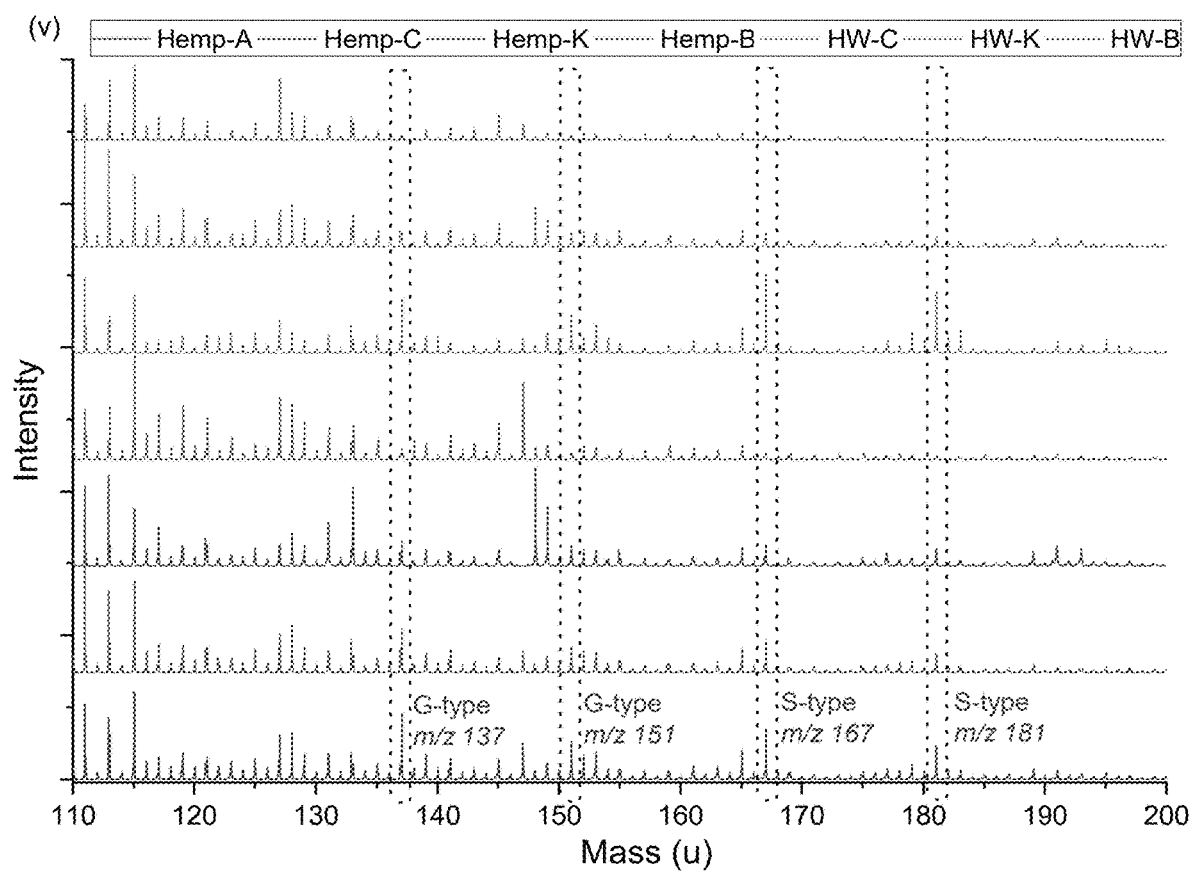

In ToF-SIMS spectra of nanocellulose films, the lignin was identified using their prominent G (C8H9O2+, C8H7O3+) and S (C9H11O3+, C9H9O9+) fragments.368 To study the distribution of lignin, RGB overlay of ToF-SIMS lignin fragment images over total fragments image was carried out (FIG. 3A-3H). For RGB overlay (specimens: o, p, q, r, s, t and u), the total fragment images (specimens: a, b, c, d, e, f and g) and lignin fragments images (specimens: h, i, j, k, l, m & n) were given red and green colors respectively. FIG. 3A shows Hemp-A, FIG. 3B shows Hemp-C, FIG. 3C shows HW-C, FIG. 3D shows Hemp-K, FIG. 3E shows Hemp-B, FIG. 3F shows HW-K, and FIG. 3 G shows HW-B. As the lignin concentration decreased with carbonate, unbleached kraft, and bleached kraft pretreated fibers (Table 2), the surface lignin distribution on CNF was also found to be reduced. This can be confirmed by a reduction in green color intensity in overlay images. Though hemp-A pulp fibers were confirmed to have highest amounts of lignin (~24 wt. %) compared to raw material (Table 2), LCNF obtained from the hemp-A appeared to have lower amounts of surface lignin (FIG. 3A, o). Though ToF-SIMS is not a quantitative analytical technique, a relative comparison of the amount of lignin present in the CNF films can be carried out conveniently. A 1 µm deep sputtered spectra of LCNF films shown in FIG. 3H depicts how hemp-A, hemp-C and HW-C possessed the highest amounts of lignin present in them. This confirms the lignin wt % numbers shown in Table 2. Though the amount of lignin present in hemp-A LCNF was observed as highest in terms of spectral intensity but surface lignin distribution was significantly low compared to hemp-C fibers, the surface lignin distribution was expected to have a significant impact on barrier properties shown in a later section.

Crystallinity of Nanocellulose Samples

Figure 4A:
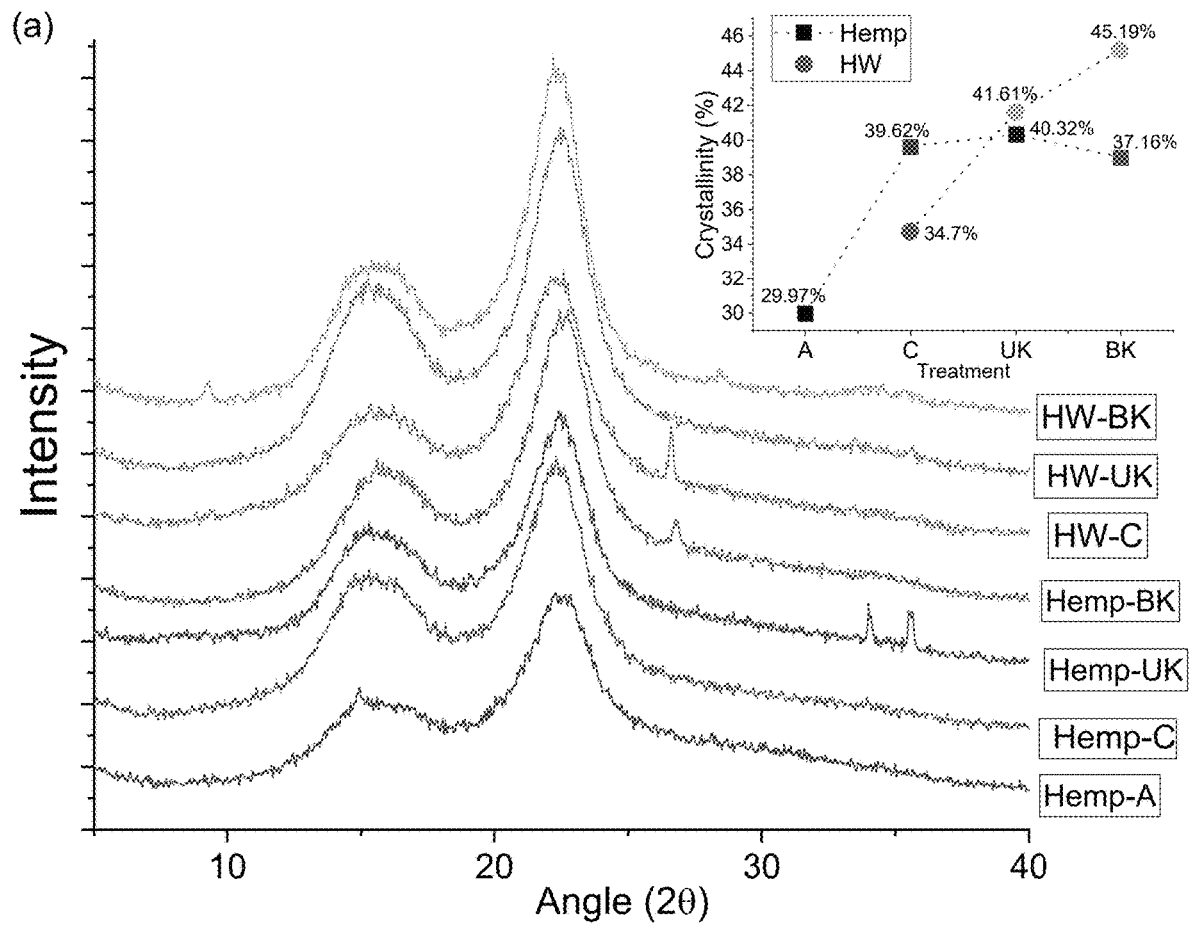
FIG. 4A provides XRD profiles and crystallinity (CI) measurements of hemp and HW nanocellulose films and FIG. 4B shows peak separation of an XRD profile for determination of the CI.
Figure 4B:
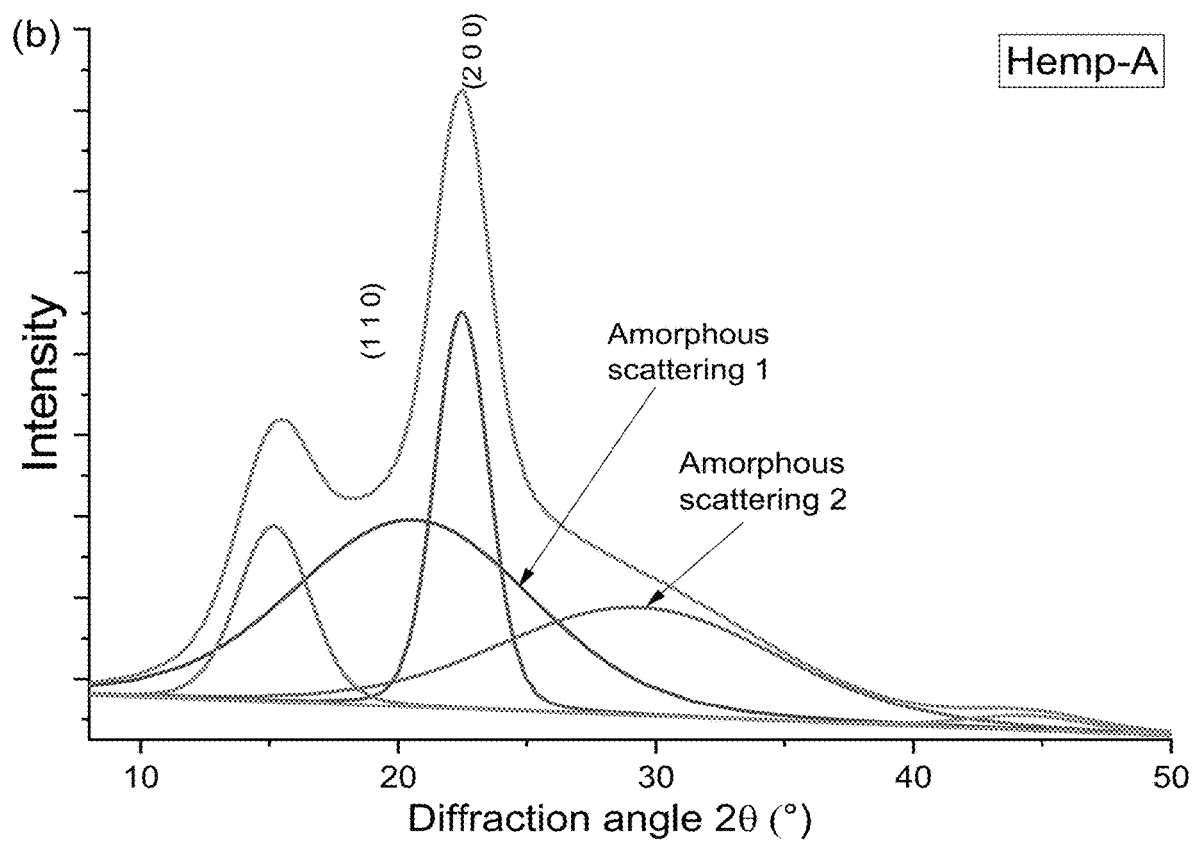

The crystallinity of the nanocellulose films was expressed as the crystallinity index (CI), which is the mass ratio of the crystalline substance in the total dry sample based on the crystallographic two-phase model (FIG. 4B). The CI values were determined by evaluating the ratio of the sum of the crystalline peak areas to the total area, assuming broad peak like nanocrystalline (amorphous) scatterings centered at 20.6° (FIG. 4B). The peak shape and center of the two amorphous scatterings was determined by maximizing both their height and full width at half-maximum before separating the crystalline diffraction peaks. A significant difference between the crystallinity of LCNF films obtained from differently pretreated HW cellulose fibers was observed. This can be related to the amorphous lignin content in the nanocellulose. Reduction in lignin content with HW-C>HW-UK>HW-BK pulp resulted in increasing CI of HW-C<HW-UK<HW-BK LCNF films. For hemp nanocellulose, a significant difference in CI was observed only between hemp-A (CI: 30%) and hemp-C (40%) CNF films. In contrast, no significant changes in CI were observed between hemp-C, hemp-UK, and hemp-BK CNF films.

Water Barrier Properties

Figure 5:
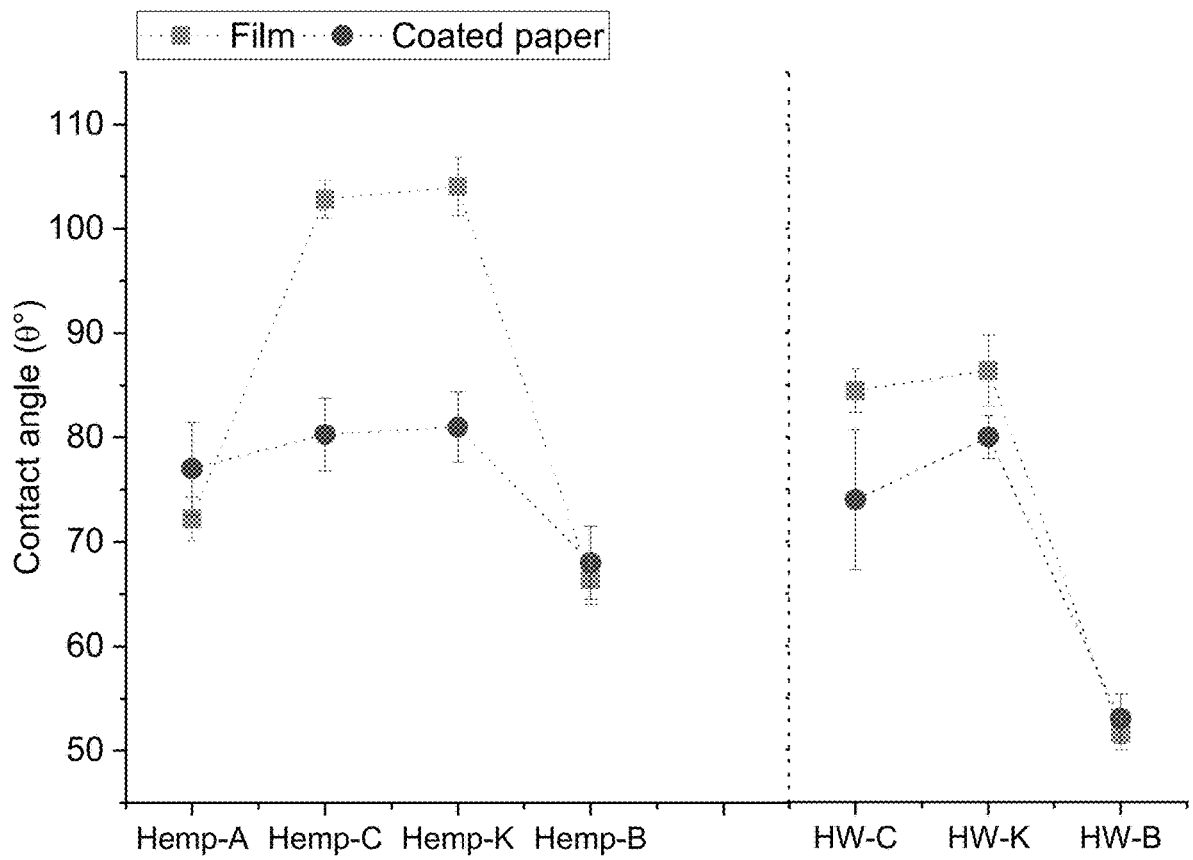
FIG. 5 provides contact angles of nanocellulose films and coated paper in accordance with embodiments of the present disclosure.

Water Contact angle: Considering that a significantly higher amount of lignin is present in A, C, and UK treated hemp and HW nanocellulose fibers, it was expected that these CNFs would be more hydrophobic compared to BK CNFs. A similar expected trend was observed for hemp and HW, and both C, UK and BK CNF films and coated papers (FIG. 5). However, hemp-A films resulted in much lower contact angles compared to hemp-C films instead of having similar lignin content (~23 wt. %). This can be explained based on surface lignin distribution of hemp-A films shown in ToF-SIMS image FIG. 3A. Though total lignin concentration present in hemp-A CNF was found to be highest but a lower amount of surface lignin was observed on hemp-A films compared to hemp-C and hemp-UK films. The contact angle of hemp-C and hemp-K CNF films was observed as 102° and 104° respectively. Hemp-BK and HW-BK films showed the lowest WCA, 66° and 51° respectively. Despite the big difference between the lignin content of C and UK treated hemp and HW CNF films and coated papers, no significant changes in contact angle was observed. It can be expected that distribution of lignin content over UK CNF films is optimum and sufficient to provide maximum hydrophobicity to the coated surface and films.

Figure 6A:
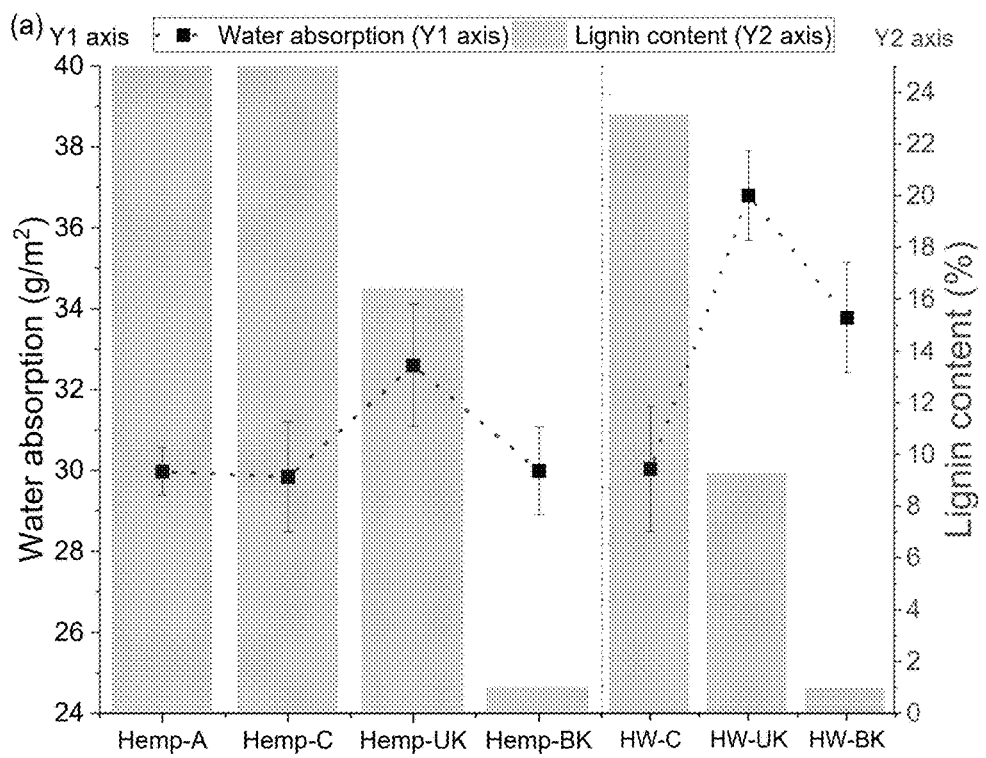
FIG. 6A is a graph of the per unit area water absorption ($g/m^2$) on coated paper and 6B is a graph of relative water absorption of nanofibrillated cellulose coated paper and films in accordance with embodiments of the present disclosure.
Figure 6B:
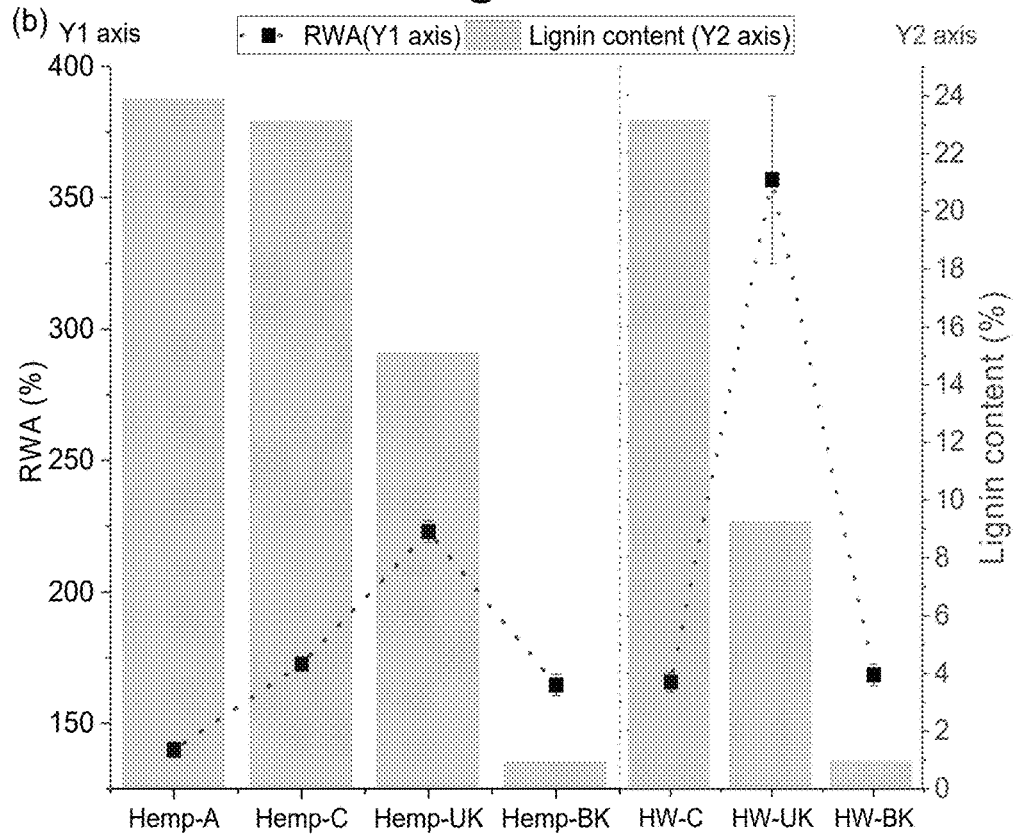
Figure 7A:
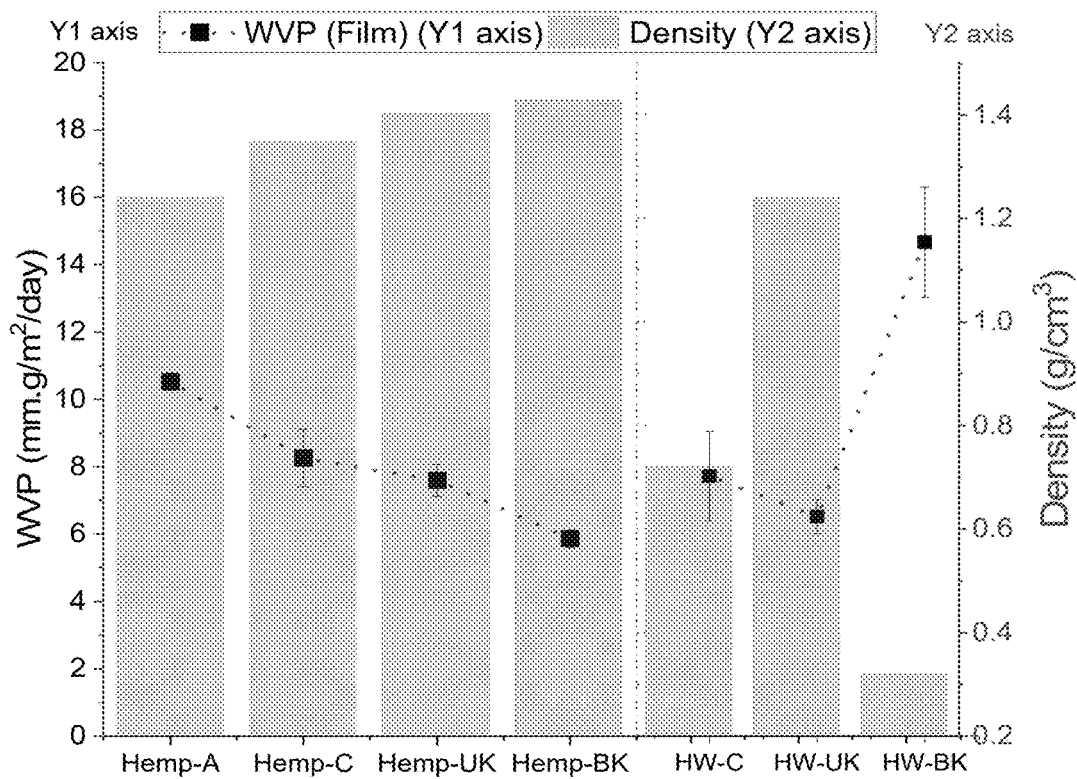
FIG. 7A-7B are graphs showing water vapor permeability (WVP) of nanofibrillated cellulose films (7A) and coated paper (7B) and coated paper in accordance with embodiments of the present disclosure.

Water absorption: Water absorption ($g/m^2$) measured on coated paper increased with a decrease in lignin and extractives content for autohydrolyzed, carbonate, and kraft hemp CNF (FIG. 6A). A similar trend of relative water absorption (RWA %) was observed with CNF films (FIG. 6B). However, water absorption measured for hemp-BK and HW-BK CNF was lowered even after having much lower content of surface and bulk lignin. Water absorption and water contact angle are known to be dependent on the surface energy and pore structure near the surface. But the surface energy for bleached CNF should be lower than unbleached CNF based on the contact angle in FIG. 6A-B and earlier studies. To explain this behavior of decrease in water absorption, a decrease in pore size can be the expected as the probable reason. This is supported by the increase in apparent density of hemp-BK CNF (FIG. 7A). However, the reduction in RWA % for HW-BK CNF could be understood based on the crystallinity. As shown in FIG. 4A, the CI of HW-BK was found to be the highest depicting has and had lowest amorphous region. Since crystalline regions absorb no or much less water compared to the amorphous regions, water absorption by HW-BK was found to be much lower compared to HW-UK CNF films.

Figure 7B:
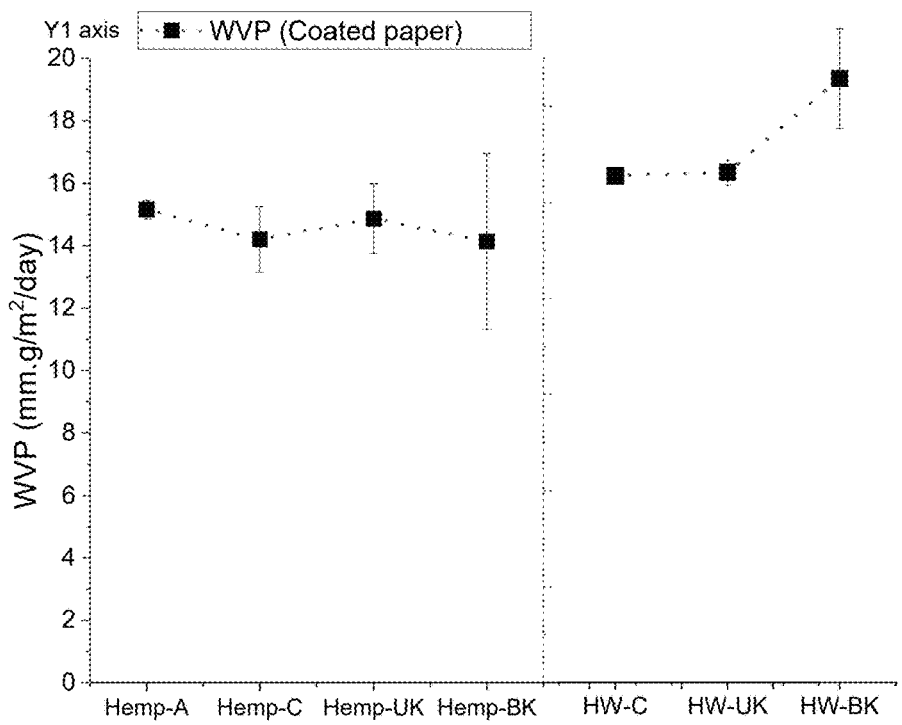

WVP: Water vapor permeability of CNF films and coated papers did not show a similar trend of reduction with bulk lignin content or surface lignin distribution (FIGS. 7A and 7B). On the other hand, WVP was found to be correlated more significantly with film density (FIG. 7B). Samples with higher density possess more compact structures and are found to be less water vapor permeable, regardless of the lignin content and distribution.

Figure 8:
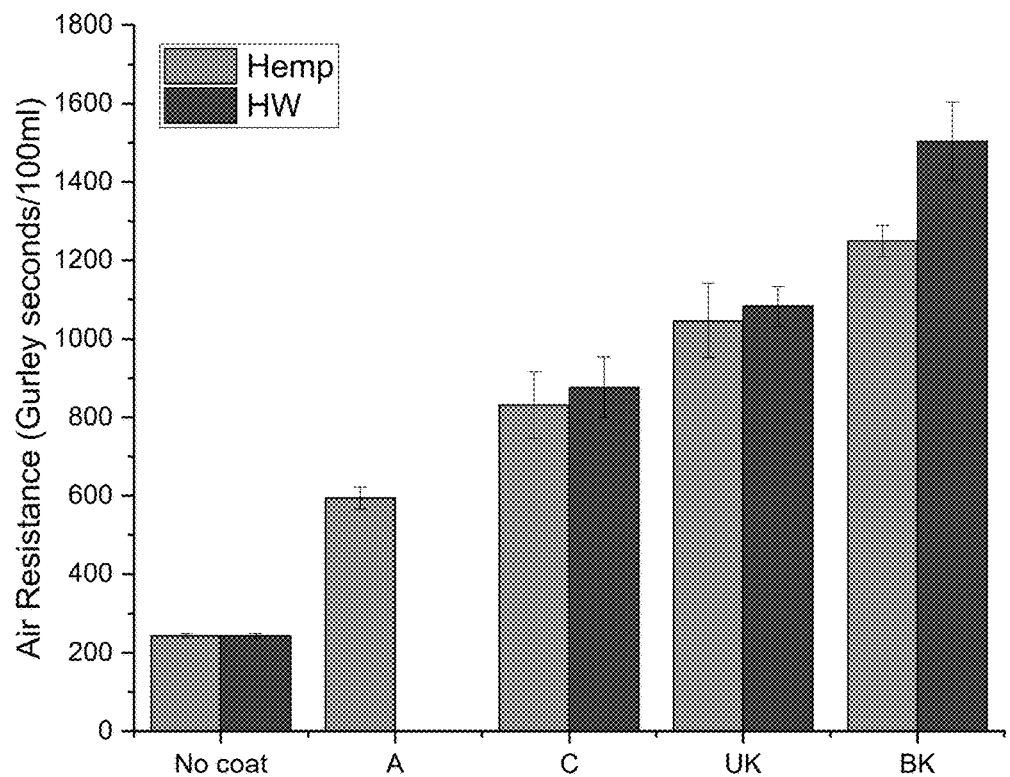
FIG. 8 is a graph showing air resistance of hemp and HW nanofibrillated cellulose coated paper in accordance with embodiments of the present disclosure.

Air resistance: The air resistance measured for CNF coated paper at 50% RH showed the linear relationship with lignin and extractives content in CNF (FIG. 8). The air resistance was observed to be lower for CNF having higher lignin content. The key factor for suitability of CNF films as gas barriers is attributed to its ability to form the dense structure of high crystalline order. The higher the density and crystalline order of films, the higher the air resistance that was observed.

Part II: Antimicrobial Properties

Characterization of Extractives

Figure 9A:
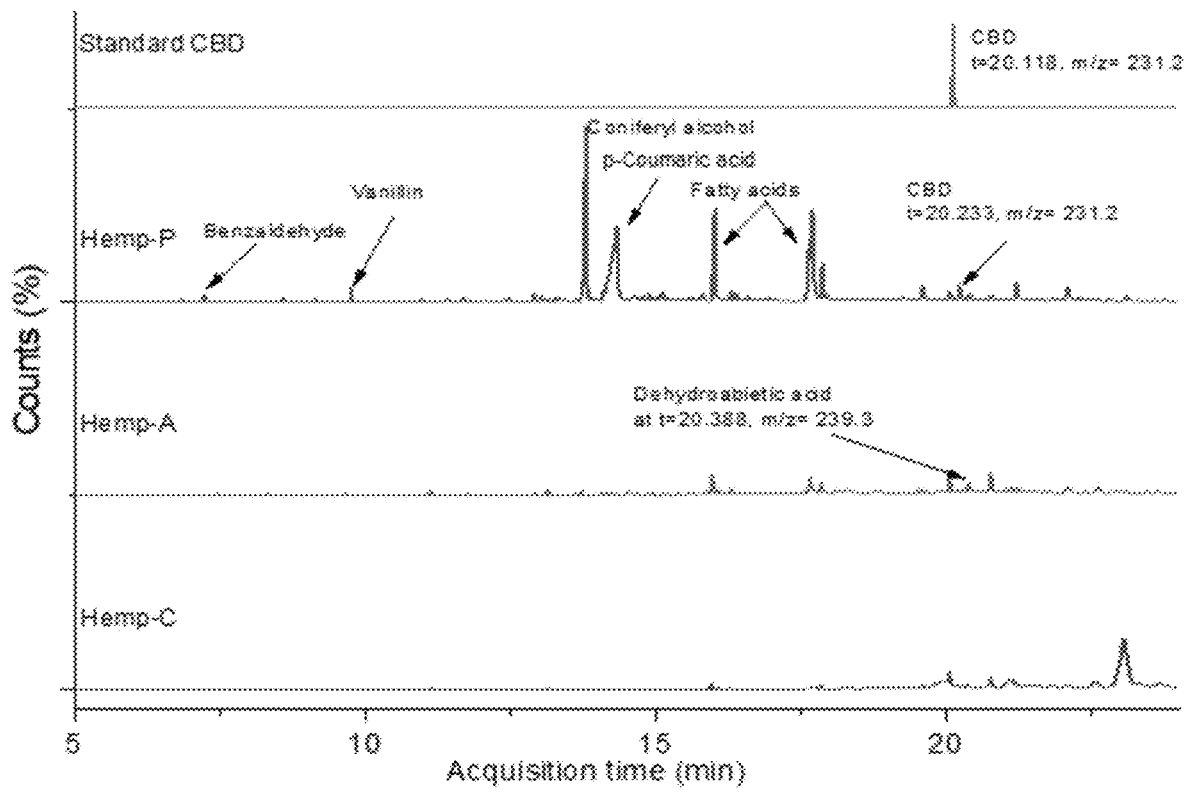
FIG. 9A provides GC-MS chromatograms of hemp-P, hemp-A, hemp-C, and standard cannabidiol.
Figure 9B:
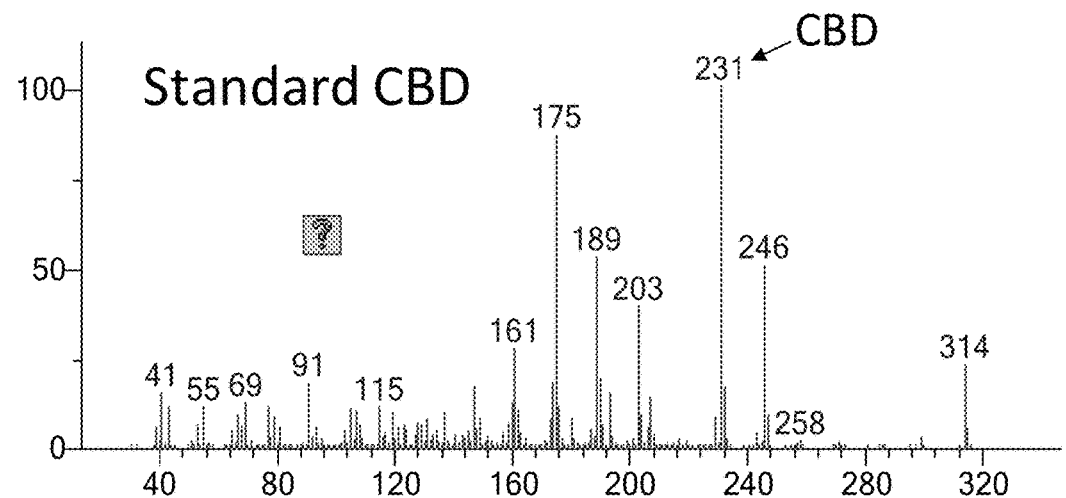
FIG. 9B provide detailed mass spectrs of hemp-P and its comparison with standard CBD and NIST library mass GC-MS mass spectra.
Figure 9B:
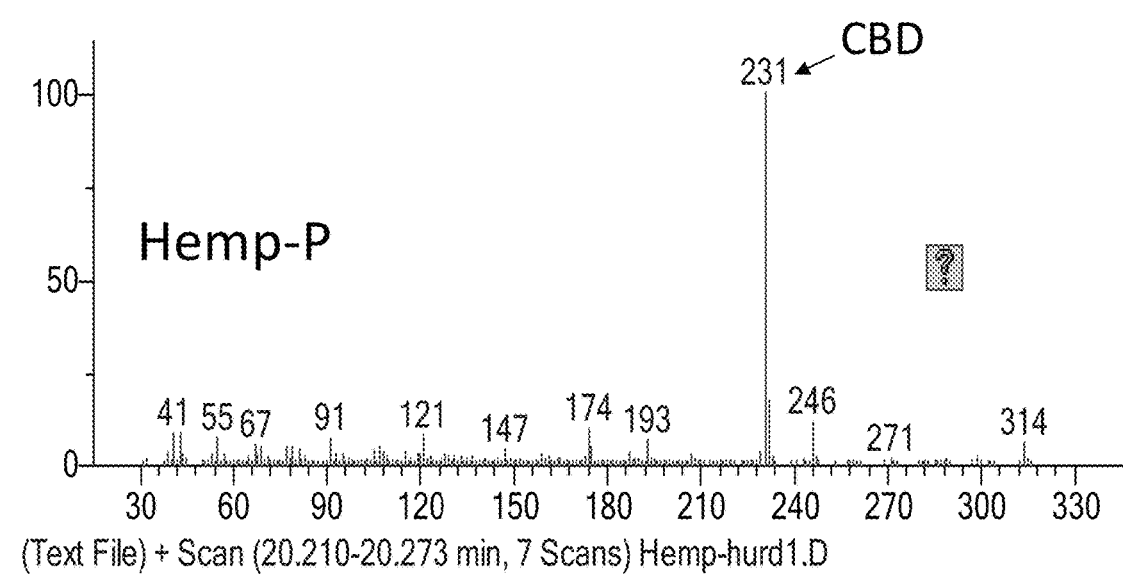
Figure 9B:
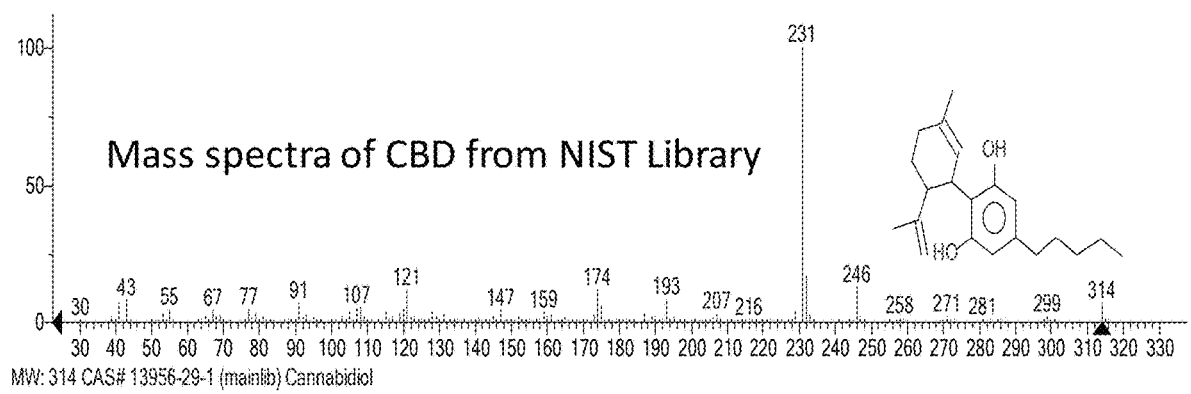

The extractives from hemp hurd powder and processed pulp were analyzed using GC-MS. The chromatogram shown in FIG. 9A shows that the extractives from hemp-P and hemp-A includes fatty acids, alkanes, aldehydes, sterols, and phenols such as clionasterol, and coumarin etc. However, extractives from hemp-C, hemp-UK, and hemp-BK were observed to have a lower number of active compounds. Earlier, it had been studied that the possession of CBD found in flowers is highest and progressively lower in leaves, petioles, stems/hurds, seeds and roots. Thus, the study of CBD concentration in stems, seeds and roots is generally excluded. In FIG. 9B, we confirmed the presence of CBD in hemp-P extractives. The probable peak for CBD in the hemp-P extractives sample was confirmed with the standard CBD peak and GC-MS NIST library.

Antimicrobial Activity

Figure 10:
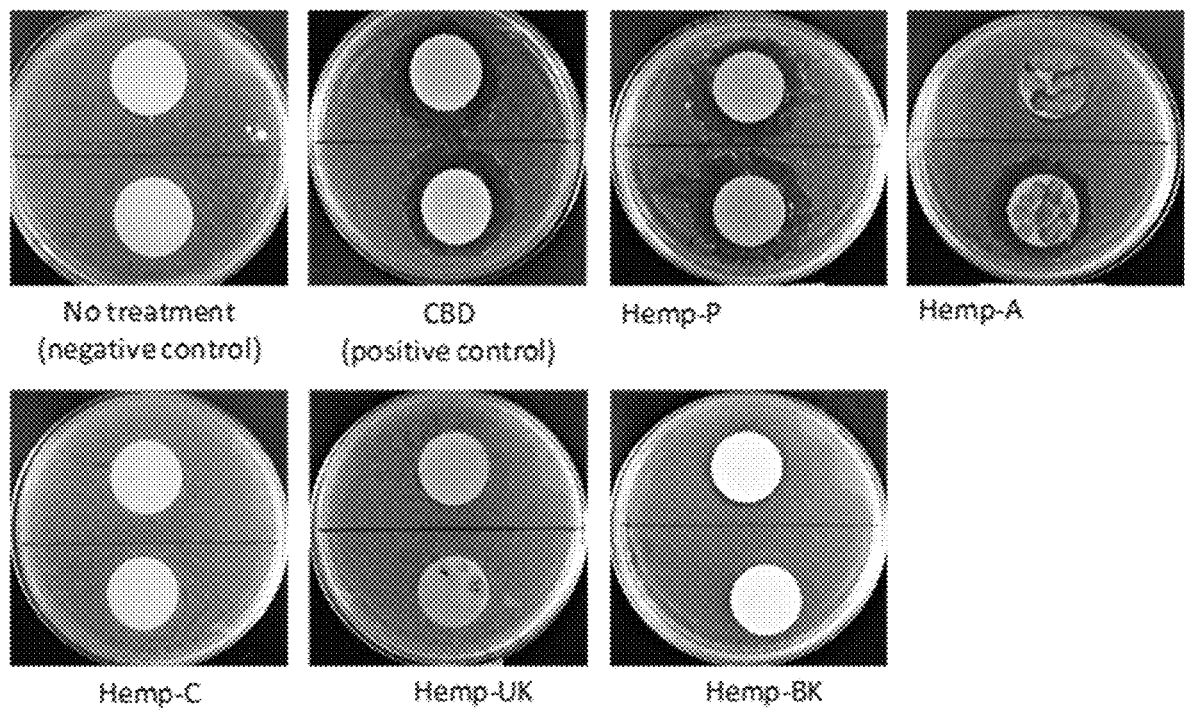
FIG. 10 shows an example of a disk diffusion assay for hemp extractives treated paper in accordance with embodiments of the present disclosure.
Figure 11A:
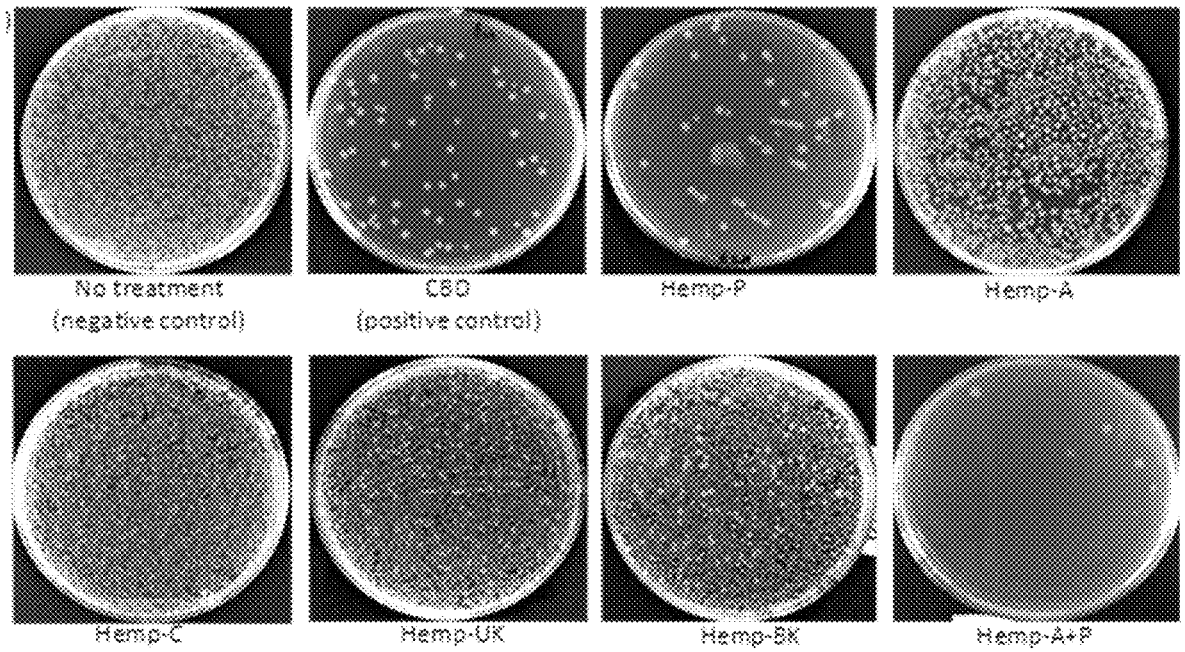
FIG. 11A shows images of a colony forming assay for antibacterial activity of hemp extractives treated paper and hemp-P extractives treated hemp-A nanofibrillated cellulose film paper in accordance with embodiments of the present disclosure.
Figure 11B:
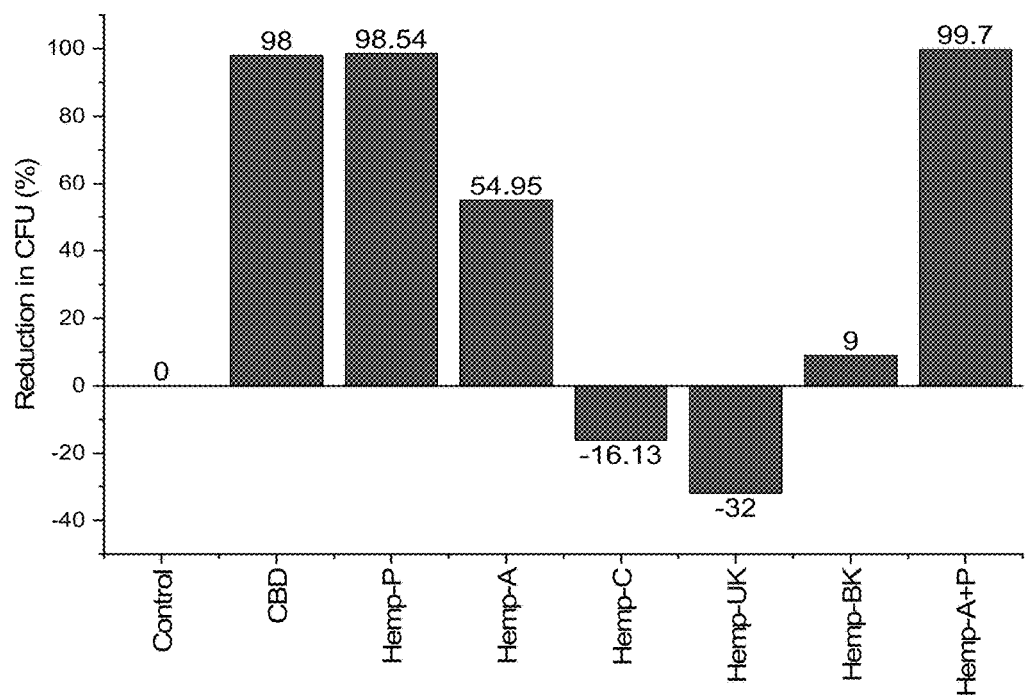
FIG. 11B is a graph illustrating the reduction of CFU for each of the samples show in FIG. 11B.

The antimicrobial activity of extractives from differently processed hemp hurds is presented in FIG. 10 (disk diffusion assay) and FIGS. 11A-11B (colony forming assay). The clear transparent zone around the treated paper discs presents the zone of inhibition. Table 3 presents the zone of inhibition, where $d_2$ is the diameter of the bacterial devoid (transparent) circle formed around the disk and $d_1$ is the diameter of the paper disk. It is evident that the hemp-P extractives treated paper disks showed the highest zones of inhibition and higher than standard CBD. The higher antibacterial activity of hemp-P extractives can be related to the fact that apart from CBD hemp hurds also contain other extractives, mainly phenolic acids, aldehydyes and fatty acids such as vanillin, syringaldehyde, p-hydroxybenzaldehyde, vanilic acid, p-coumaric acid, acetosyringone and gallic acid. Hemp-A extractives also resulted in zone of inhibition of around 1.05 cm against *E. coli* for one test but not for the replicates. However, hemp-C, hemp-UK, and hemp-BK did not show any antibacterial activity. The results can also be related to their extractives content provided in Table 2 and GC-MS plots shown in FIG. 9A-9B. Other than the autohydrolysis pulping process, most of the active compounds (extractives) washed away with the carbonate and kraft pulping processes. Thus, no antibacterial activity was observed with the extractives from carbonate and kraft pulped fibers.

TABLE 3

| Zone of bacterial growth inhibition ($d_2$-$d_1$) | |
| --- | --- |
| Sample Id. | Zone of inhibition (cm) |
| negative Control | 0 |
| CBD | 1.55 ± 0.22 |
| Hemp-P | 1.85 ± 0.15 |
| Hemp-A | 1.05 ± 0.71 |
| Hemp-C | 0 |

TABLE 3-continued

Zone of bacterial growth inhibition ($d_2$-$d_1$)

| Sample Id. | Zone of inhibition (cm) |
|---|---|
| Hemp-UK | 0 |
| Hemp-BK | 0 |

To confirm the antimicrobial activity of hemp hurd and processed pulp extractives, a colony forming assay was carried out using treated paper disks (FIG. 11A). The colony forming assay confirmed the reduction in bacterial colony forming units (CFU) by 98.54% for hemp-P extractives, which was similar to the antibacterial activity of pure CBD (98%) (FIG. 11B). The hemp-A extractives treated sheet also showed reduction in CFU by 55%, which confirms the zone of inhibition shown in the disk diffusion assay. The antimicrobial test was also carried out for hemp nanocellulose films and coated papers; however, no antimicrobial activities were observed, not even for hemp-A CNF film. This can be due to the absence of sufficient amounts of active compounds in the used CNF films and coated paper. To study the potential for antimicrobial hemp nanocellulose films, hemp-A CNF film was treated with hemp-P extractives (200 μg of extractives/mg of dry CNF). A 99.7% in CFU reduction was observed with Hemp-A CNF treated film with hemp-P extractives (Hemp-A+P).

Conclusion

Part I: Barrier Coating

Hemp hurd lignin containing nanocellulose fibers were obtained from differently treated (autydrolyzed, 4% carbonated, unbleached and bleached kraft processed) pulp fibers using Masuko grinder. Eucalyptus hardwood nanocellulose fibers were also obtained using similar processes to compare the barrier properties. The morphological, crystallinity and chemical characterization of CNF films was carried out using SEM, XRD, EDX and ToF-SIMS analytical techniques. Water barrier properties of lignin-containing CNF films from hemp and HW were measured in terms of water contact angle, water vapor transmission rate and water absorption. The barrier properties were found to be dependent not only on the lignin content and lignin distribution but also on the CNF film density and porous structure. Lignin-containing CNF films and coated paper showed much higher WCA)(80°-102° than bleached CNF films. Similar results were observed for LCNF coated papers. WVP was found to be more dependent on density of films than lignin content.

Part II: Antimicrobial Coating

The hemp extractives obtained from hemp hurd powder and processed hemp pulp showed the presence of many active compounds. Only hemp hurd powder evidently had the CBD. The antimicrobial tests with hemp CNF films and coated paper did not show any antimicrobial activity. However, paper disks treated with extractives from hemp-P and hemp-A showed significant reductions in bacterial growth conformed by disk diffusion as well as a colony forming assay. Finally, the hemp-A CNF were treated with the extractives obtained from hemp-p and found to be 99.7% effective for antibacterial activity against *E. coli*. This work has paved the way for combining the barrier and antimicrobial properties in lignin-containing nanocellulose fibers obtained from hemp hurds.

Example 2

Abstract

This work examined the antimicrobial activity of unprocessed hemp hurds powder, processed hemp hurds (LNFC), and their ethanol extractives. The hemp hurd shives were pulped to obtain fibers by employing a hydrothermal process. The obtained cellulose fibers were further processed into LNFC using intensive mechanical processing. The extractives of hemp hurd powder was obtained using ethanol and benzene. The chemical characterization of hemp hurds extractives for the presence of antimicrobial active compounds was carried out using GC-MS. The LNFC films and extractives-treated paper were tested against *E. coli* for their antimicrobial activity. The extractives-treated paper showed a significant reduction in bacterial growth and resulted in a zone of bacterial inhibition up to 1.85 mm in disk diffusion assays. The antimicrobial activity of extractives was confirmed by doing a colony-forming assay that showed a bacterial inhibition by 98% colony forming units (CFU). However, no significant antimicrobial activity of unprocessed hemp hurd powder or LNFC films was observed. On the contrary, treating LNFC films with obtained extractives resulted in a reduction of CFU by 99.7%. These results of using hemp extractives and LNFC as antimicrobial coatings open a great potential for valorizing the industrial hemp waste for sustainable antimicrobial applications.

Introduction

Industrial hemp, a non-psychoactive variety of *Cannabis sativa* L.,[1] has historical and worldwide importance as manufacturers are finding it to be a renewable and sustainable resource for a wide variety of consumer and industrial products [2]. *Cannabis sativa* is an upright, annual herb that is mostly dioecious and grows up to 1-6 m in height [3,4]. The inner core part of hemp stem is a woody (xylem core body) material and also known as hurd or shive. The outer layer consists of fiber bundles known as bast fibers [5,6]. Bast fibers are the most well-known part of the stalk that are used for cordage, rope, netting, canvas, bio-composites, and textiles [6]. However, bast fibers represent a relatively small percentage of total biomass of hemp stems (~15%) compared to the xylem core/hurd fibers, which account for ~85% of total biomass of hemp.[7] The woody or hurd fibers are lignified and generally used as animal bedding due to their high absorption capacity and ability to insulate concrete-like floor surfaces [8].

Antimicrobial activity has received much attention during studies of hemp products. A few studies have shown that the antimicrobial activity of hemp fibers is linked to their chemical extractives, such as esterified sterols, and triterpenes (β-sitosterol and β-amyrin), which are known to possess antimicrobial properties. [9-11] However, other studies have shown that hemp contains numerous biologically active compounds known as cannabinoids, which are responsible for their antimicrobial activity [8,12,13]. Cannabinoids are carboxylic acids of C21 or C22 compounds in the form of analogs and transformation products [14]. There are more than 40 cannabinoids that have been found in hemp plants. Among these, five major cannabinoids (namely cannabidiol (CBD), cannabichromene (CBC), cannabigerol (CBG), Δ9-tetrahydrocannabinol (Δ9 THC), and cannabinol (CBN)) have been well studied in terms of their structures and properties [14], CBD and THC both have demonstrated antimicrobial activity against Gram positive and Gram negative bacteria in addition to a few varieties of fungi [15]. While, CBD is the primary therapeutic component of hemp, THC is the psychoactive component. Hemp hurds from medicinal *Cannabis sativa* varieties such as Futura 75 are known to have higher content of lignin and phytochemicals than bast fibers and are thus are superior in their antimicrobial activity [12,13].

Most of the studies on antimicrobial activity of hemp has been focused on their polar and non-polar solvent extractives. The solvents used for extraction of phytochemicals from hemp and cellulosic fibers for antibacterial functionality are petroleum ether, acetone, methanol, ethanol, hexane, and water [12,16-22]. Ali et al. studied the effects of petroleum ether and methanol extracts of whole *Cannabis sativa* L. plants for antimicrobial activity against Gram positives (*B. subtilis* and *S. aureus*), Gram negatives (*E. coli* and *P. aeruginosa*) and fungi (*A. niger* and *C. albicans*) [16]. They found that both petroleum ether and methanol extractives showed pronounced or good antimicrobial activity against all selected microorganisms. Mathur et al. showed that aqueous and ethanolic extract of *Cannabis sativa* exhibited sufficient antimicrobial activity against *P. aeruginosa* and *S. aureus*, but were inactive against *E. coli* and *C. albicans* [19]. However, Wasim et al. showed that an aqueous extract of hemp did not demonstrate any antimicrobial activity against the microorganisms tested, including Gram positives, Gram negatives, and fungi [21]. A few studies have focused on antimicrobial activity of hemp fibers using different treatments with associative antimicrobial agents. These treatments include incorporation of silver nanoparticles (AgNPs) on oxidized hemp fibers [23,24], chemisorption of AgNPs on hemp fibers [25], and grafting of hemp fibers with antibiotics such as β-cyclodextrin, etc [26].

As discussed previously, hemp extractives from non-polar solvents and physically or chemically modified hemp fibers have shown pronounced antimicrobial activity against a wide range of microorganisms. Very few studies show the antimicrobial activity of hemp fibers themselves [13], To our knowledge, only Khan studied the antimicrobial activity of hemp hurd powder against *E. coli* [13,27], Khan studied the effects of particle size and pre-heat treatment of hemp hurd powder on antimicrobial activity. It was shown in their study that lignin content and particle size played important roles in the antimicrobial activity of hemp hurd powder. However, no chemical characterization was carried out in that study to support their claims.

The objective of this research, therefore, is to explore the antimicrobial activity of hemp hurd powder, defibrillated fibers, and their benzene and ethanolic extractives. Hemp hurd shives were defibrillated to lignin containing fibers using hydrothermal, carbonate and kraft pulping methods [28-30], The generated lignin containing cellulose fibers were converted to nanoscale fibers (CNF) using an ultra-fine friction grinder (Masuko). The rationale behind converting hemp fibers into CNF was as follows: nanoscale hemp fibers would expose more cannabinoids (if present in hemp hurds) and lignin on the coatings and film surface. Because only Khan et al. (2015) confirmed the antimicrobial activity of hemp hurd powder without extraction, hemp hurds extractives were also extracted from hemp hurd powder and tested for their antimicrobial property [13].

Experimental

Materials

Dew retted and decorticated Futura 75 hemp (*Cannabis sativa* L.) hurds stems were procured from the Netherlands. The hemp hurds were ~15-30 mm in length, ~4-5 mm in width, and ~1-2 mm in thickness after removal of fines by passing it through a 9.5 mm slot screen. A Wiley mill grinder was used to grind the hemp hurds into powder. A Masuko grinder was used to prepare nanocellulose. Ethanol and benzene were used for the extraction process and were procured from Sigma-Aldrich at 99.98% purity. Distilled water was used for autohydrolysis, washing, and all other purposes. Abn-CBD ($C_{21}H_{30}O_2$) solubilized in methyl acetate (5 mg/ml) was procured from TOCRIS Biosciences at 99.7% purity.

Methods

Hemp hurd shives were ground into powder (P) using a Wiley mill grinder and screened through 40 mesh screens to get 1 mm snippets. Extractives were isolated from hemp-P using ethanol and benzene employing TAPPI T 204 method. The hydrothermal/autohydrolysis (A) defibrillation process was carried out similar to Naithani et al. (2019), by soaking cut pieces of hemp hurd shives in distilled water with a shives to water ratio of 1:8 at a temperature 160° C. for 3 hours in a stainless steel pulping reactor (Greenwood Instruments, LLC, Andover, MA, U.S.A.) at pressure 90 psi [31]. After three hours, the softened hemp hurd stems (pulp) was washed and refined on the laboratory disc refiner at disc gaps of (0.1-0.05) mm with two passes before screening on a 0.15-mm slotted laboratory screen. Lignin wt. % in hemp-P and hemp-A fibers were estimated by employing the TAPPI T 236 method. Fibrillation of hemp-A pulp into lignin-containing nanofibrillated cellulose (LNFC) was carried out using a Masuko grinder at 1500 rpm using 30 passes with a final 2.48% consistency.

The morphological characterization of produced LNFC was carried out using scanning electron microscopy (SEM) under FEI XHR-VERIOS 460L field emission SEM. The chemical characterization of extractives from hemp-P and hemp-A pulp was carried out using GC and a mass spectrometer (GC-MS). Extractives were dissolved in methyl acetate before being analyzed with GC-MS. The LCNF films with thickness 50 μm were prepared by using the solvent casting method in polytetrafluoroethylene petri dishes under controlled conditions [32]. The films were conditioned at 23° C. and 50% RH for 24 hours before testing.

The antimicrobial activity was tested against *E. coli* using a disk diffusion (Kirby-Bauer) assay. For the disk diffusion assay, the overnight grown culture of *E. coli* in lysogeny broth (LB) media was diluted to 0.5 McFarland concentration (0.5 OD at 600 nm) using a $KH_2PO_4$ buffer. The 100 μl culture was transferred to the LB agar plates. The extractives obtained from hemp-P and hemp-A pulp were used to treat a sterilized filter paper substrate. The 200 μl of each extractives sample (1 mg/ml) were added to different filter discs and dried before being placed over the *E. coli* culture spread on an LB agar plate. LNFC films were also tested in the similar fashion as filter paper discs. The treated *E. coli* petri dishes were incubated overnight at 37° C. The inhibited bacterial growth was measured using a ruler by subtracting the diameter of the original disk from the diameter of the zone of inhibition (a transparent area devoid of *E. coli* growth). The antimicrobial activity of hemp-P and hemp-A extractives was also confirmed using the ASTM E2149 method, which is the same as that discussed by Khan et al.[13,33] For comparison, the antimicrobial test of pure CBD oil procured from TOCRIS Biosciences as a positive control was also carried out.

Results and Discussions

Figure 12:
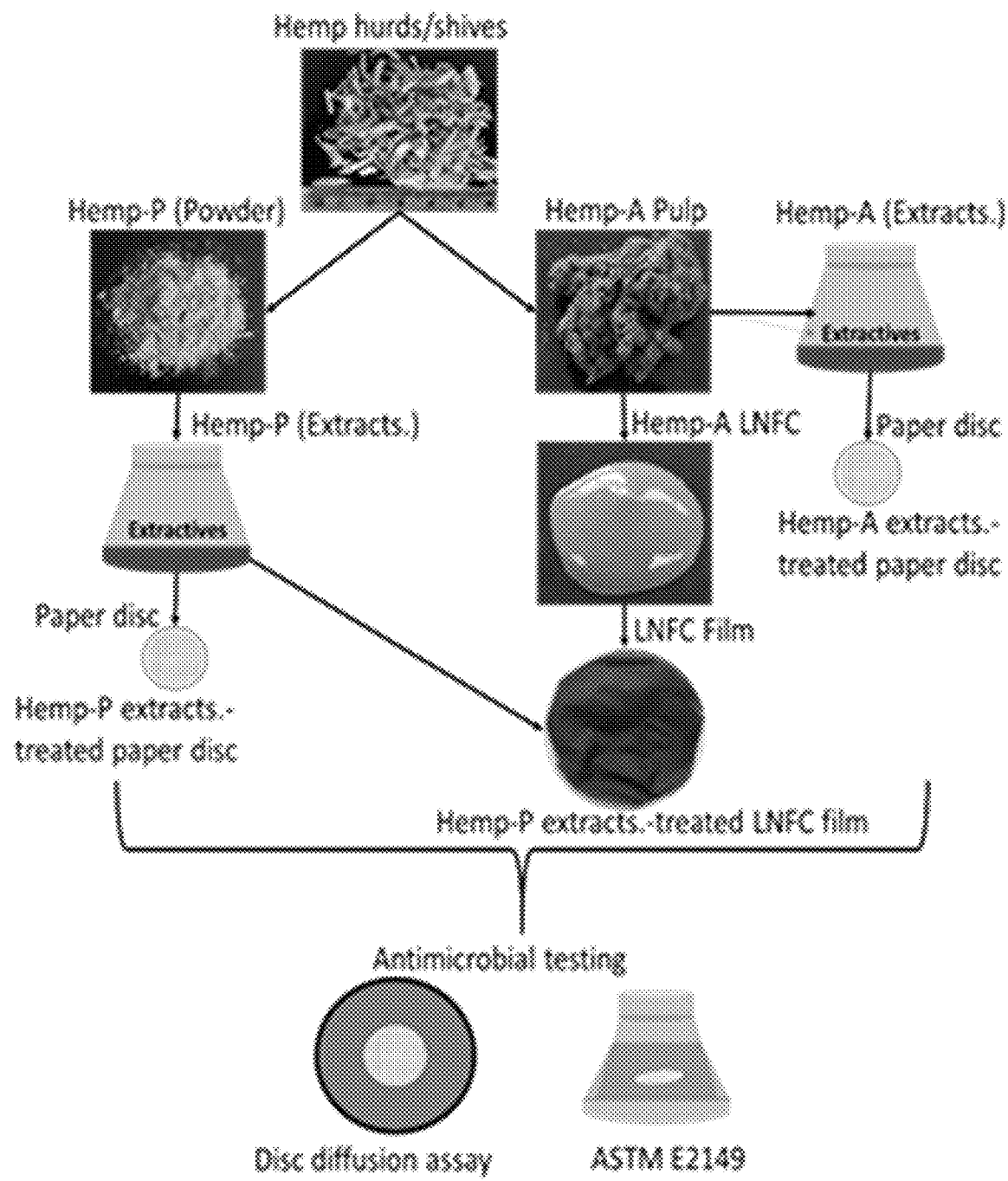
FIG. 12 provides a simplified schematic of exploration of hemp hurds extractives and LNFC for antimicrobial activity in accordance with embodiments of the present disclosure.

FIG. 12 depicts the schematic of steps taken in the process of using hemp hurds for testing its potential for antimicrobial activity. The employed chemical free autohydrolysis process to obtain hemp hurds pulp (hemp-A) is green process to obtain high yield pulp fibers (73%) [31]. The LNFC produced using hemp-A pulp fibers appeared to be gel like material. The morphology of LNFC is described in the next section.

Morphology of Lignin Containing Nanofibrillated Cellulose (LNFC)

The SEM images in FIG. 13A show the morphology of nanofibers obtained from hemp-A pulp fibers at two different magnifications. Most of the fibers appeared to be 'micro and nano-fibrils' and 'nanofibril-aggregates' from the cell wall that is not yet entirely disintegrated. The fibrils were branched at the ends, splitting into finer fibrils at nanoscale diameters (diameter ~45 nm). Extremely fine fibrils are also present in the SEM images, but not visible at the length scale (FIG. 13B). The spherical particles seen on the surface were mainly composed of carbon and oxygen, as shown in SEM-EDX spectra (FIG. 13C) and earlier studies [34], and can be nanolignin particles. However, the conversion of cell wall lignin to spherical nanolignin shape particle in autohydrolysis reaction is not fully understood and needs further study, which is out of scope for this research.

Chemical Characterization of Extractives

Figure 14A:
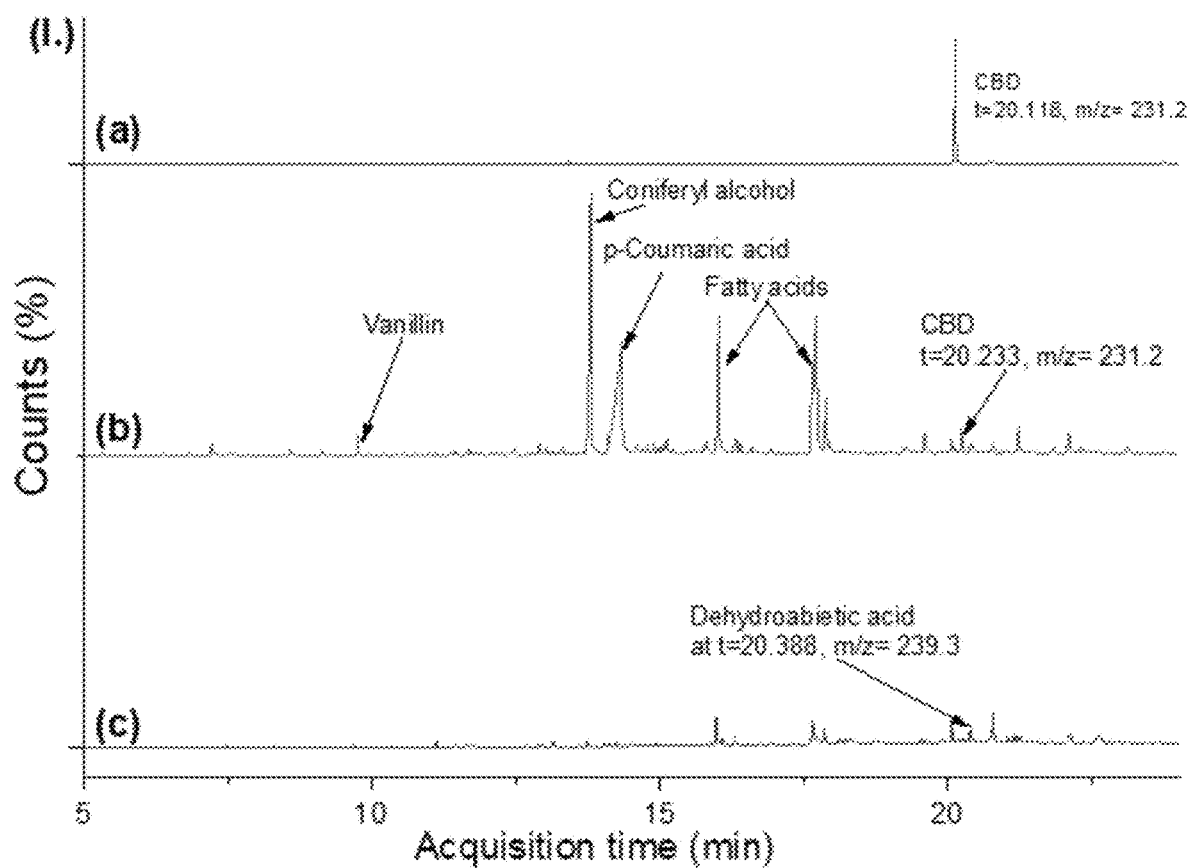
FIG. 14A shows GC-MS chromatograms of (a) CBD oil, (b) Hemp-P extractives and (c) Hemp-A extractives, and FIG. 14B provides detailed mass spectra of Hemp-P extractives and its comparison with standard CBD and NIST library mass GC-MS mass spectra.
Figure 14B:
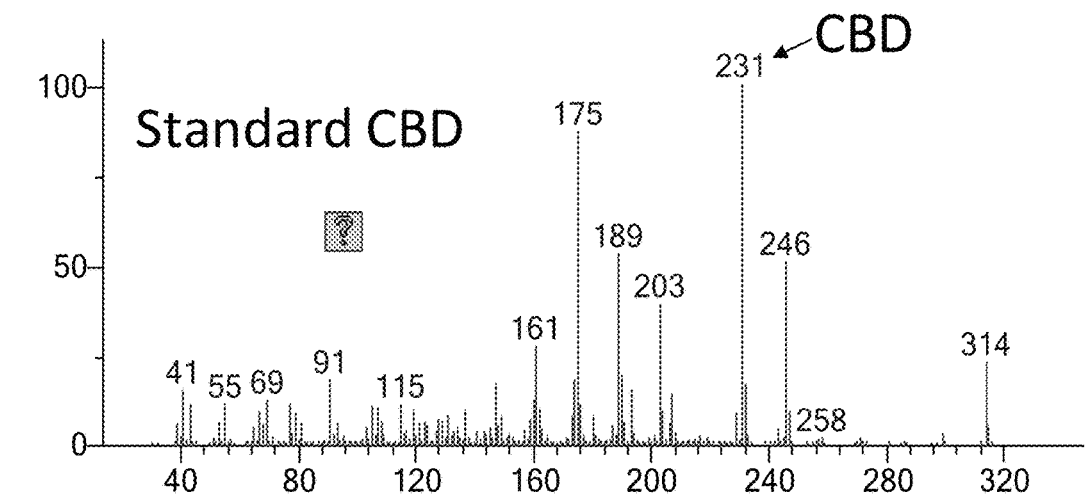
Figure 14B:
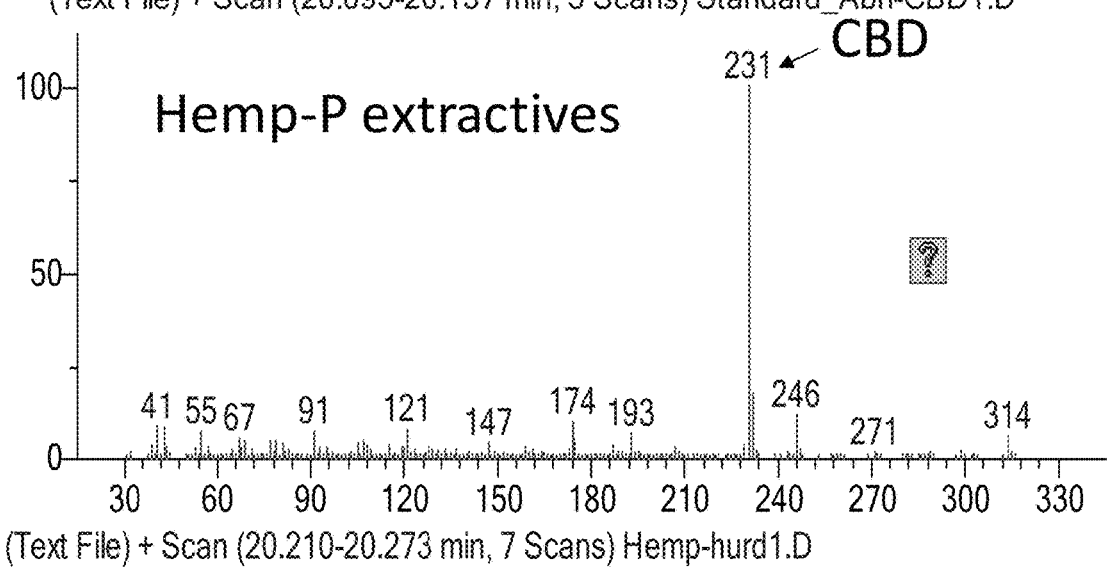
Figure 14B:
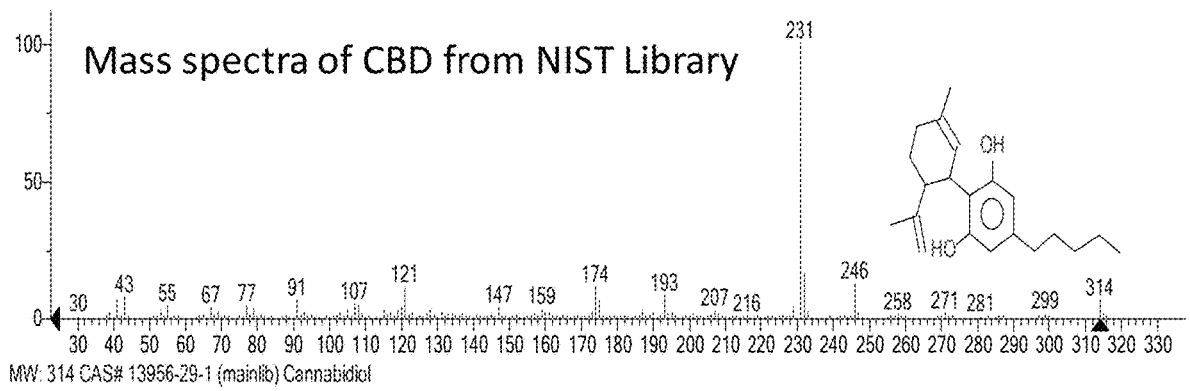

The extractives from hemp-P and hemp-A were analyzed using GC-MS. The chromatogram shown in FIG. 14A illustrates that the extractives from hemp-P includes fatty acids, alkanes, aldehydes, sterols, and phenols such as clionasterol and coumarin, etc. Earlier, it had been reported that the possession of CBD found in flowers is highest and progressively lower in leaves, petioles, stems/hurds, seeds and roots. Thus, the study of CBD concentration in stems, seeds and roots is generally excluded [35]. In FIG. 14A, the presence of CBD in hemp-P extractives was confirmed. The probable peak for CBD in the hemp-P extractives sample was confirmed by comparing with the standard CBD peak and GC-MS NIST library in FIG. 14B.

Antimicrobial Activity

Figure 15:
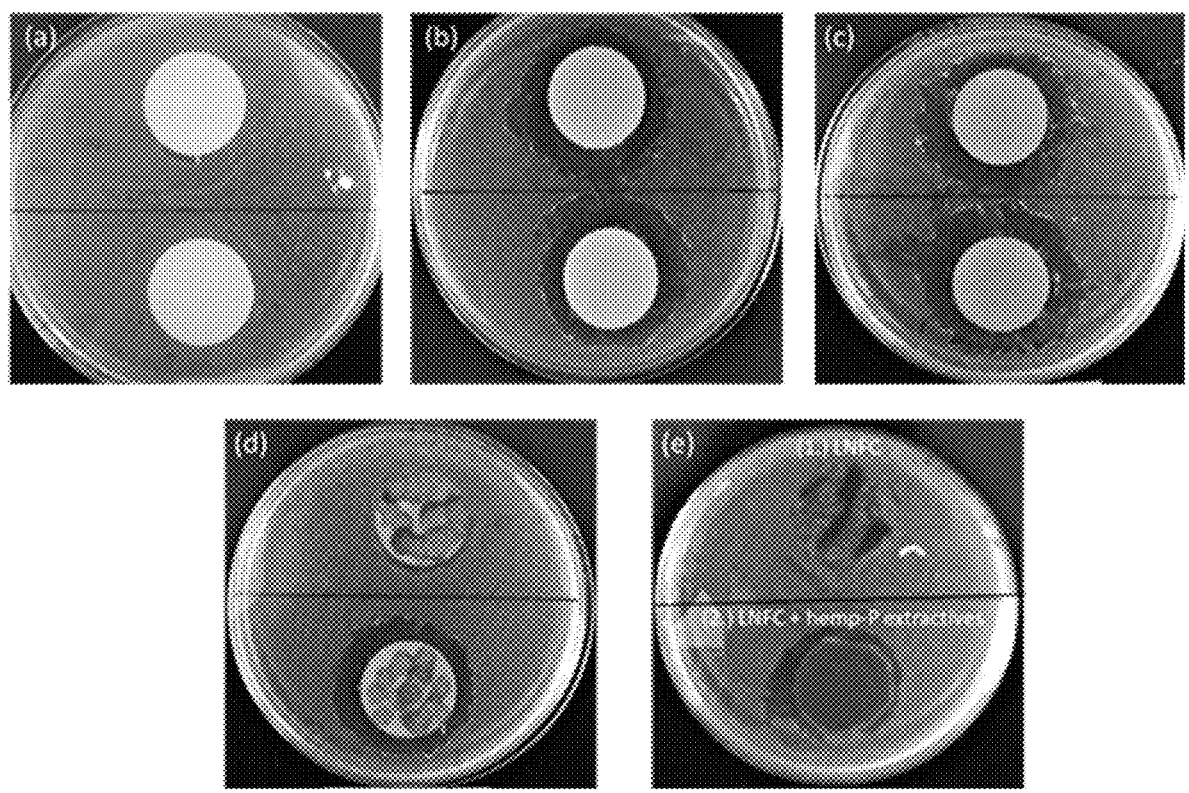
FIG. 15 shows a disk diffusion assay of (a) Control (untreated), (b) CBD oil (c) Hemp-P extractives and (d) Hemp-A extractives treated paper discs, and (e) LNFC film (1) without and (2) with treatment of Hemp-P extractives in accordance with embodiments of the present disclosure.

The antimicrobial activity of LNFC films, hemp-P and extractives from hemp-P and hemp-A were tested. The LNFC films and hemp-P itself did not show any antimicrobial activity, as confirmed by both disk diffusion and colony forming assay. This is in contradiction with the results reported by Khan et al. 2015 [13]. The antimicrobial activity of purchased CBD, obtained extractives from hemp-P and hemp-A is presented in FIG. 15 (disk diffusion assay) and FIG. 16 (colony forming assay). The clear transparent zone around the treated paper discs represents the zone of inhibition.

Table 4 lists the values of the zones of inhibition, where d2 is the diameter of the bacterial devoid (transparent) circle formed around the disk and d1 is the diameter of the paper disk. It is evident that the hemp-P extractives-treated paper disks had the highest zones of inhibition and higher than standard CBD. The higher antimicrobial activity of hemp-P extractives can be related to the fact that apart from CBD, hemp hurds also contain other extractives, mainly phenolic acids, aldehydes and fatty acids such as vanillin, syringaldehyde, p-hydroxybenzaldehyde, vanilic acid, p-coumaric acid, acetosyringone and gallic acid [12,36]. Though no studies have been done in the past to show the antimicrobial activity of individual mentioned extractives from hemp, Khan discussed the possibility of extractives other than CBD having antimicrobial activity [12].

TABLE 4

| | Zone of bacterial growth inhibition ($d_2$-$d_1$). | |
|---|---|---|
| Sample Id. | Antimicrobial Treatment System | Zone of inhibition (cm) |
| (a) | None | 0 |
| (b) | CBD treated paper disks | 1.55 ± 0.22 |
| (c) | Hemp-P extractives-treated paper disks | 1.85 ± 0.15 |
| (d) | Hemp-A extractives-treated paper disks | 1.05 ± 0.71 |
| (e) | Hemp-P extractives-treated LNFC film | 0.83 ± 0.23 |

Hemp-A extractives-treated paper disks also resulted in zones of inhibition of ~1.05 cm against *E. coli*. The results can also be related to their extractives content given GC-MS plots, as shown in FIG. 14. After the autohydrolysis pulping process of hemp hurds, a substantial amount of the active compounds (extractives) were washed away from the fibers as shown in FIG. 14. Thus, limited antimicrobial activity was observed from hemp-A pulped fibers extractives, which may be potentially be on account of the limited amount of the original extractives and/or coumaric acid, acetosyringone, etc. [36].

Figure 16A:
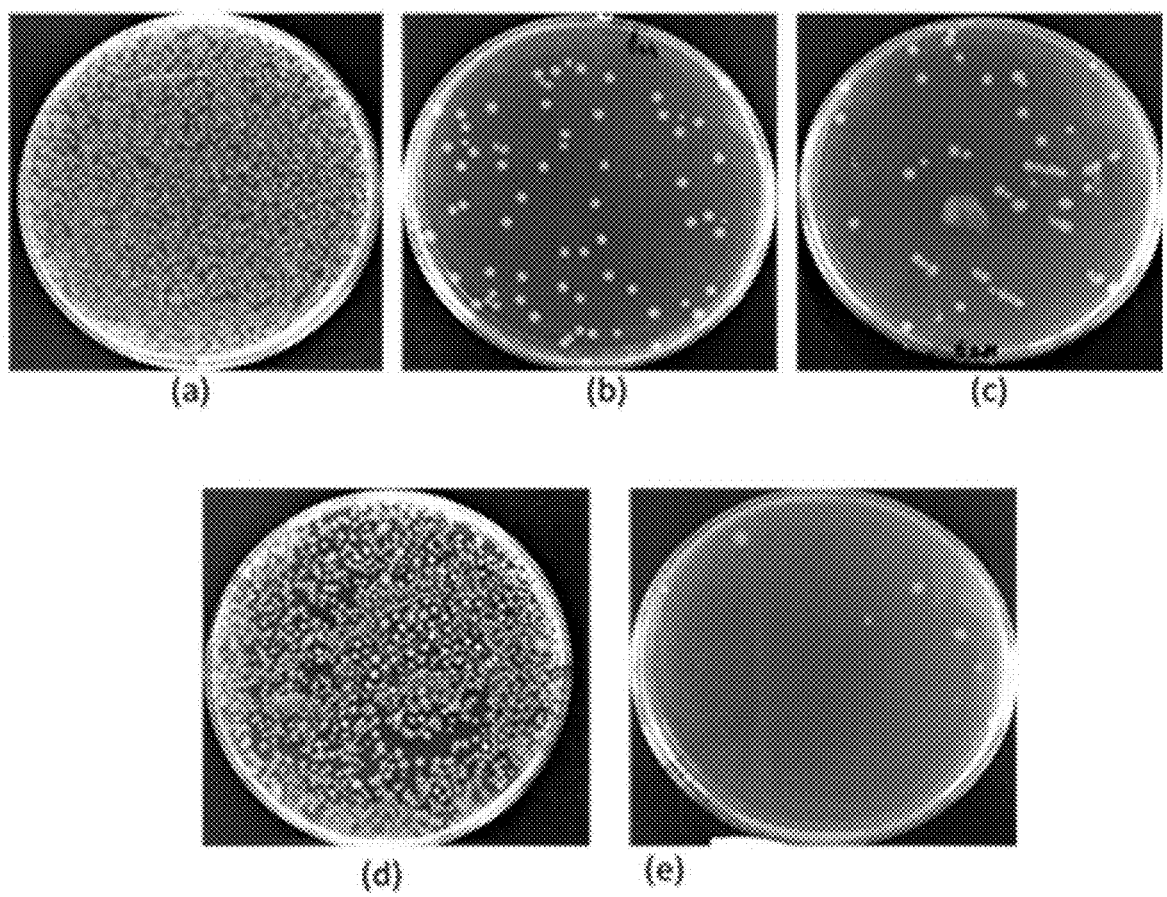
FIG. 16A shows petri dishes images and FIG. 16B shows reduction in CFU after performing colony forming assay of (a) control (untreated) (b) CBD oil, (c) Hemp-P extractives and (d) Hemp-A extractives treated paper disks, and (e) Hemp-P extractives treated LNFC films in accordance with embodiments of the present disclosure.
Figure 16B:
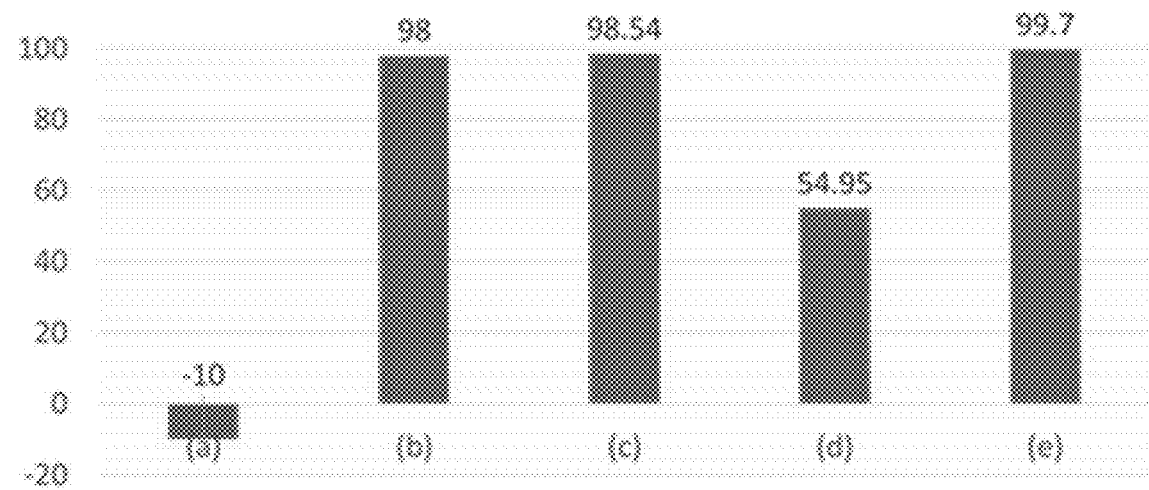

To further confirm the antimicrobial activity of hemp-P and hemp-A extractives, a colony forming assay was carried out using treated paper disks (FIG. 16). The colony forming assay confirmed a reduction in bacterial colony forming units (CFU) by 98.54% for hemp-P extractives, which was similar to the antimicrobial activity of pure CBD (98%) (FIG. 16.II (b & c)). The hemp-A extractives treated sheet also showed reduction in CFU by 55%, which confirms the zone of inhibition shown in the disk diffusion assay (FIG. 16.II (d)). The antimicrobial test was also carried out for LNFC films and hemp-P itself; however, no antimicrobial activities were observed likely due to the absence of sufficient levels of active compounds. Hemp-P extractives-treated LNFC films (200 μg of hemp-P extractives/mg of dry LNFC) resulted in a reduction of CFU by 99.7% (FIG. 16.II (e)). These result shows a great potential of treated-LNFC in medical and hygiene applications. An earlier study by Agate et al. (2020) adds another opportunity to combine this work with the clean production of LNFC using dual asymmetric centrifugation force (DAC) in sterilized one-pot process for medical usage [37].

Conclusions

There was a considerable amount of hemp antimicrobial extractives obtained from hemp hurd powder and autohydrolyzed hemp pulp fibers. Hemp hurd powder evidently had a detectable amount of CBD, as confirmed with GC-MS. The untreated hemp hurd powder and untreated autohydrolyzed LNFC films used directly did not show antimicrobial activity, which contradicts results from earlier studies. However, the extractives from hemp hurd powder showed a significant reduction in bacterial colonies. The paper disks treated with extractives from hemp hurd powder and autohydrolyzed hemp pulp fibers showed significant reductions in bacterial growth, as confirmed by disk diffusion as well as a colony forming assay. Finally, the autohydrolyzed hemp hurd LNFC films treated with the extractives obtained from hemp hurd powder were found to be 99.7% effective for antimicrobial activity against *E. coli*. This work has paved the way for lignin-containing nanocellulose fibers to confer antimicrobial properties with the use of hemp hurds.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

REFERENCES

[1] Pellati F, Borgonetti V, Brighenti V, Biagi M, Benvenuti S, Corsi L. Cannabis sativa L. and Nonpsychoactive Cannabinoids: Their Chemistry and Role against Oxidative Stress, Inflammation, and Cancer. Biomed Res Int 2018; 2018:1-15.

[2] Darby H, Agronomist UVME, Gupta A, Cummings E, Ruhl L, Ziegler S. 2017 Industrial Hemp Fiber Variety Trial. Univ Vermont Ext 2018.

[3] Miller N G. THE GENERA OF THE CANNABACEAE IN THE SOUTHEASTERN UNITED STATES. J Arnold Arbor 1970; 51:185-203.

[4] Raman V, Lata H, Chandra S, Khan I A, ElSohly M A. Morpho-Anatomy of Marijuana (Cannabis sativa L.). Cannabis sativa L.—Bot. Biotechnol., Cham, Switzerland: Springer International Publishing; 2017, p. 123-36. https://doi.org/10.1007/978-3-319-54564-6.

[5] Ouajai S, Shanks R A. Composition, structure and thermal degradation of hemp cellulose after chemical treatments. Polym Degrad Stab 2005; 89:327-35. https://doi.org/10.1016/j.polymdegradstab.2005.01.016.

[6] Marsh G. Next step for automotive materials. Mater Today 2003; 6:36-43. https://doi.org/10.1016/S1369-7021(03)00429-2.

[7] Li X, Wu N, Morrell J J, Du G, Tang Z, Wu Z, et al. Influence of hemp plant eccentric growth on physical properties and chemical compounds of hemp hurd. BioResources 2018; 13:290-8. https://doi.org/10.15376/biores.13.1.290-298.

[8] Andre C M, Hausman J-F, Guerriero G. Cannabis sativa: The Plant of the Thousand and One Molecules. Front Plant Sci 2016; 7:1-17. https://doi.org/10.3389/fpls.2016.00019.

[9] Gutiérrez A, Del Río J C. Chemical characterization of pitch deposits produced in the manufacturing of high-quality paper pulps from hemp fibers. Bioresour Technol 2005; 96:1445-50. https://doi.org/10.1016/j.biortech.2004.12.008.

[10] Kiprono P C, Kaberia F, Joseph M, Karanja J N. The in vitro Anti-Fungal and Anti-Bacterial Activities of ß-Sitosterol from Senecio lyratus (Asteraceae). Zeitschrift Für Naturforsch 2000; 55:485-8. https://doi.org/0939-5075/2000/0500-0485.

[11] Ibrahim T A. Chemical Composition and Biological Activity of Extracts from Salvia bicolor Desf Growing in Egypt. Molecules 2012; 17:11315-34. https://doi.org/10.3390/molecules171011315.

[12] Khan B A, Warner P, Wang H. Antibacterial Properties of Hemp and Other Natural Fibre Plants: A Review. Bio Resour 2014; 9:3642-59. https://doi.org/10.15376/biores.9.2.3642-3659.

[13] Khan B A, Wang J, Warner P, Wang H. Antibacterial properties of hemp hurd powder against E. coli. J Appl Polym Sci 2015; 132:1-6. https://doi.org/10.1002/app.41588.

[14] Appendino G, Gibbons S, Giana A, Pagani A, Grassi G, Stavri M, et al. Antibacterial cannabinoids from Cannabis sativa: A structure-activity study. J Nat Prod 2008; 71:1427-30. https://doi.org/10.1021/np8002673.

[15] Glodowska M, Łyszcz M. Cannabis sativa L. and its antimicrobial properties—A review. Badania i Rozw. Mlodych Nauk. w Polsce-Agron. i Ochr. roślin, Strona, Italy: 201AD, p. 77-82.

[16] M. E M A, Almagboul A Z I, Khogali S M E, Gergeir U M A. Antimicrobial Activity of Cannabis sativa L. J Chinese Med 2012; 3:61-4. https://doi.org/10.4236/cm.2012.31010.

[17] Tandon C, Mathur P. Review Article Antimicrobial Efficacy of Cannabis sativa L. (Bhang): A Comprehensive Review 2017; 44:94-100.

[18] Zhuang Z, Zhang J, Li M, Deng G, Ou Z, Lian W, et al. Optimizing the extraction of antibacterial compounds from pineapple leaf fiber. Open Life Sci 2016; 11:391-5. https://doi.org/10.1515/biol-2016-0052.

[19] Mathur P, Singh A, Srivastava V R, Singh D, Mishra Y. Antimicrobial activity of indigenous wildly growing plants: Potential source of green antibiotics. African J Microbiol Res 2013; 7:3807-15. https://doi.org/10.5897/AJMR2012.2368.

[20] Borhade S S. Chemical Composition and Characterization of Hemp (Cannabis sativa) Seed oil and essential fatty acids by HPLC Method. Sch Res Libr Arch Appl Sci Res 2013; 5:5-8.

[21] K W, I U H, Ashraf M. Antimicrobial studies of the leaf of Cannabis sativa. Pakistran J Pharm Sci 1995; 8:29-38.

[22] Leizer C, Ribnicky D, Poulev A, Dushenkov S, Raskin I. The Composition of Hemp Seed Oil and Its Potential as an Important Source of Nutrition. J Nutraceuticals, Funct Med Foods 2000; 2:35-53. https://doi.org/10.1300/J133v02n04.

[23] Milanović J, Mihailović T, Popović K, Kostić M. Antimicrobial oxidized hemp fibers with incorporated silver particles. J Serbian Chem Soc 2012; 77:1759-73. https://doi.org/10.2298/JSC121018143M.

[24] Praskalo-Milanovic J Z, Kostic M M, Dimitrijevic-Brankovic S I, Skundric P D. Silver-Loaded Lyocell Fibers Modified by TEMPO-Mediated Oxidation. J Of Applied Polymer Sci 2010; 117:1772-9. https://doi.org/10.1002/app.32128.

[25] Kostic M M, Milanovic J Z, Baljak M V., Mihajlovski K, Kramar A D. Preparation and characterization of silver-loaded hemp fibers with antimicrobial activity. Fibers Polym 2014; 15:57-64. https://doi.org/10.1007/s12221-014-0057-7.

[26] Racu C, Cogeanu A M, Diaconescu R M, Grigoriu A. Antimicrobial treatments of hemp fibers grafted with β-cyclodextrin derivatives. Text Res J 2012; 82:1317-28. https://doi.org/10.1177/0040517512441995.

[27] Khan B A. Development of Antibacterial Hemp Hurd/Poly (Lactic Acid) Biocomposite for Food Packaging 2017.

[28] Garrote G, Eugenio M E, Díaz M J, Ariza J, López F. Hydrothermal and pulp processing of Eucalyptus. Bioresour Technol 2003; 88:61-8. https://doi.org/10.1016/S0960-8524(02)00256-0.

[29] Yayin I. Optimization of Sodium Carbonate-Sodium Hydroxide Pulping of Wheat Straw for Corrugating Medium Production. Western Michigan University, 1992.

[30] Steltenkamp M S, Fla P. Kraft Pulping process. 4,507,172, 1985.

[31] Naithani V, Tyagi P, Jameel H, Lucia L A, Pal L. Ecofriendly and Innovative Processing of Hemp Hurds Fibers for Tissue and Towel Paper. BioResources 2020; 15:706-20.

[32] Hubbe M A, Ferrer A, Tyagi P, Yin Y, Salas C, Pal L, et al. Nanocellulose in thin films, coatings, and plies for packaging applications: A review. BioResources 2017; 12:2143-233. https://doi.org/10.15376/biores.12.1.2143-2233.

[33] National Cheng Kung University. Standard Test Method for Determining the Antimicrobial Activity of Immobilized Antimicrobial Agents Under Dynamic Contact Conditions 1. ASTM E2149-01, 2010. https://doi.org/10.1520/E2149-01.2.

[34] Rojo E, Peresin M S, Sampson W W, Hoeger I C, Vartiainen J, Laine J, et al. Comprehensive elucidation of the effect of residual lignin on the physical, barrier, mechanical and surface properties of nanocellulose films. Green Chem 2015; 17:1853-66. https://doi.org/10.1039/c4gc02398f.

[35] Field B I, Arndt R R. Cannabinoid compounds in South African *Cannabis sativa* L. J Pharm Pharmacol 1980; 32:21-4. https://doi.org/10.1111/j.2042-7158.1980.tb12838.x.

[36] Gandolfi S, Ottolina G, Riva S, Fantoni G P, Patel I. Complete Chemical Analysis of Carmagnola Hemp Hurds and Structural Features of Its Components. BioResources 2013; 8:2641-56.

[37] Agate S, Tyagi P, Naithani V, Lucia L, Pal L. Innovating Generation of Nanocellulose from Industrial Hemp by Dual Asymmetric Centrifugation. ACS Sustain Chem Eng 2020; 8:1850-8. https://doi.org/10.1021/acssuschemeng.9b05992.

We claim:

1. A barrier film or coating comprising:
   treated nanofibrillated cellulose obtained by treating nanofibrillated cellulose with hemp extractives; and
   wherein the treated nanofibrillated cellulose contains the hemp extractives, the hemp extractives comprising vanillin, syringaldehyde, p-hydroxybenzaldehyde, vanillic acid, p-coumaric acid, acetosyringone, and gallic acid.

2. The barrier film or coating of claim 1, wherein the nanofibrillated cellulose is derived from hemp hurds, hemp bast fibers, hemp, hemp stems, hemp mixed, hemp waste, softwood, hardwood, or a combination thereof.

3. The barrier film or coating of claim 1, wherein the barrier film or coating has antimicrobial properties.

4. The barrier film or coating of claim 3, wherein the hemp extractives are Hemp-P extractives and wherein the antimicrobial properties include about a 98% or greater reduction in colony forming units when compared to an untreated substrate.

5. The barrier film of claim 2, wherein the barrier film or coating has a basis weight of greater than 15 $g/m^2$ or about 25 $g/m^2$ or about 50 $g/m^2$.

6. The barrier film of claim 2, wherein the barrier film has a thickness of about of 10 μm to 250 μm.

7. A packaging product comprising:
   a substrate having a barrier film or coating, wherein the barrier film or coating comprises treated nanofibrillated cellulose obtained by treating nanofibrillated cellulose with hemp extractives; and wherein the nanofibrillated cellulose is obtained from autohydrolysed hemp pulp; and
   wherein the treated nanofibrillated cellulose contains the hemp extractives, the hemp extractives comprising vanillin, syringaldehyde, p-hydroxybenzaldehyde, vanillic acid, p-coumaric acid, acetosyringone, and gallic acid.

8. The packaging product of claim 7, wherein the substrate is selected from containerboard, packaging paper, linerboard packaging paper, whitetop, mottled white, brown paper, kraft liners, recycled paper, cartonboards, folding boxboard, kraft papers, solid unbleached board, solid bleached board, or food packaging papers.

9. The packaging product of claim 7, wherein the packaging product comprises about 0.5 to 15 $g/m^2$ of barrier film or coating.

10. The packaging product of claim 7, wherein the barrier film or coating has a thickness of about 0.5 to 25 μm.

11. The packaging product of claim 7, wherein the hemp extractives are Hemp-C or Hemp-K extractives and wherein the barrier film or coating has a water contact angle of about 102°.

12. The packaging product of claim 7, wherein the barrier film or coating has antimicrobial properties.

13. The packaging product of claim 12, wherein the hemp extractives are Hemp-P extractives and wherein the antimicrobial properties include about a 98% or greater reduction in colony forming units when compared to an untreated substrate.

14. The packaging product of claim 7, wherein the barrier film or coating is solvent casted, solvent casted and air-dried, solvent casted and hot air dried, vacuum casted, filtered casted, filtered and pressed formed, vacuum dewatered and air-dried, mold casted, or a combination thereof.

15. The packaging product of claim 7, wherein the barrier film or coating is applied using size press, metered size press, rod coater, blade coater, spray coating, dip coating, slot die coating, flexo coater, gravure coater, curtain coater or a combination thereof.

16. The packaging product of claim 7, wherein the packaging product has a basis weight of greater than 15 $g/M^2$.

17. A method of making an antimicrobial paper product comprising:
   obtaining pulp fibers from autohydrolyzed hemp hurds;
   mechanically grinding the pulp fibers to obtain nanofibrillated cellulose;
   solvent casting the nanofibrillated cellulose films in an aqueous system;
   treating the nanofibrillated cellulose films with hemp extractives to obtain treated nanofibrillated cellulose films; and
   applying the hemp extractive treated films to a substrate, wherein the treated nanofibrillated cellulose films contain the hemp extractives, the hemp extractives comprising vanillin, syringaldehyde, p-hydroxybenzaldehyde, vanillic acid, p-coumaric acid, acetosyringone, and gallic acid.

18. The method of claim 17, wherein the substrate is selected from containerboard, packaging paper, linerboard packaging paper, whitetop, mottled white, brown paper, kraft liners, recycled paper, cartonboards, folding boxboard, kraft papers, solid unbleached board, solid bleached board, food packaging papers, creped or uncreped tissue papers, single or multiply towel papers, single face corrugated papers, or napkin paper for food sanitary applications.

19. The method of claim 17, wherein the hemp extractives are extracted from hemp hurd powder.

20. The method of claim 17, further comprising processing the substrate, wherein the processing occurs before the applying step, after the applying step, or both; and wherein the processing is selected from calendaring, laminating, embossing, curing, printing, or a combination thereof.

21. The method of claim 17, further comprising bonding single or multilayer structures to the paper product, and wherein the bonding is mechanical, chemical, thermal, or a combination thereof.

* * * * *